(12) United States Patent  
Palacharla et al.

(10) Patent No.: US 7,920,792 B2
(45) Date of Patent: Apr. 5, 2011

(54) SYSTEM AND METHOD FOR MANAGING COMMUNICATION IN A HYBRID PASSIVE OPTICAL NETWORK

(75) Inventors: Paparao Palacharla, Richardson, TX (US); Martin Bouda, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 949 days.

(21) Appl. No.: 11/743,311

(22) Filed: May 2, 2007

(65) Prior Publication Data

US 2008/0273877 A1 Nov. 6, 2008

(51) Int. Cl.
*H04J 14/00* (2006.01)
(52) U.S. Cl. .................. 398/72; 398/71; 398/74
(58) Field of Classification Search .................. 398/70, 398/72, 74, 75, 71
See application file for complete search history.

(56) References Cited

U.S. PATENT DOCUMENTS

| | | |
|---|---|---|
| 4,555,810 A | 11/1985 | Khoe et al. |
| 5,285,305 A | 2/1994 | Cohen et al. |
| 5,321,541 A | 6/1994 | Cohen |
| 5,440,416 A | 8/1995 | Cohen et al. |
| 5,579,421 A | 11/1996 | Duvall et al. |
| 5,694,234 A | 12/1997 | Darcie et al. |
| 5,926,298 A | 7/1999 | Li |
| 6,144,472 A | 11/2000 | Knox |

(Continued)

FOREIGN PATENT DOCUMENTS

EP 1 028 331 8/2000

(Continued)

OTHER PUBLICATIONS

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

(Continued)

*Primary Examiner* — Dzung D Tran
(74) *Attorney, Agent, or Firm* — Baker Botts L.L.P.

(57) ABSTRACT

In accordance with the teachings of the present invention, a system and method for managing communication in a hybrid passive optical network (HPON) is provided. In a particular embodiment, the method includes transmitting, at a first wavelength, a first configuration message on the HPON. The method also includes receiving at one or more of a plurality of receivers at an optical line terminal (OLT) one or more configuration response messages from one or more optical network units (ONUs) in a first set of ONUs. The method further includes, based on the configuration response messages from the first set of ONUs, associating, in a database, each ONU in the first set of ONUs with the first wavelength and with the receiver receiving the configuration response message from the ONU. The method also includes, after transmitting the first configuration message, transmitting, at a second wavelength, a second configuration message on the HPON. The method further includes receiving at one or more of the plurality of receivers at the OLT one or more configuration response messages from one or more ONUs in a second set of ONUs, wherein the ONUs in the second set of ONUs do not belong to the first set of ONUs. The method also includes, based on the configuration response messages from the second set of ONUs, associating, in the database, each ONU in the second set of ONUs with the second wavelength and with the receiver receiving the configuration response message from the ONU.

28 Claims, 6 Drawing Sheets

U.S. PATENT DOCUMENTS

| | | | |
|---|---|---|---|
| 6,163,637 A | 12/2000 | Zirngibl | |
| 6,411,410 B1 | 6/2002 | Wright et al. | |
| 6,498,876 B1 | 12/2002 | Liu et al. | |
| 6,767,139 B2 | 7/2004 | Brun et al. | |
| 7,245,829 B1 | 7/2007 | Sindile | |
| 7,389,048 B2 | 6/2008 | Kani et al. | |
| 2002/0196491 A1 | 12/2002 | Deng et al. | |
| 2003/0002102 A1 | 1/2003 | Khalfallah et al. | |
| 2004/0001718 A1 | 1/2004 | Matthews | |
| 2004/0131357 A1 | 7/2004 | Farmer et al. | |
| 2004/0184806 A1 | 9/2004 | Lee et al. | |
| 2005/0129404 A1 | 6/2005 | Kim et al. | |
| 2005/0175343 A1 | 8/2005 | Huang et al. | |
| 2005/0175344 A1 | 8/2005 | Huang et al. | |
| 2005/0180689 A1 | 8/2005 | Kozhevnikov et al. | |
| 2006/0056849 A1 | 3/2006 | Pamart et al. | |
| 2006/0067692 A1* | 3/2006 | Park et al. | 398/75 |
| 2006/0083245 A1* | 4/2006 | Tanaka et al. | 370/395.2 |
| 2006/0146855 A1* | 7/2006 | Kani et al. | 370/430 |
| 2006/0153567 A1 | 7/2006 | Kim et al. | |
| 2007/0092249 A1 | 4/2007 | Akasaka et al. | |
| 2007/0092250 A1 | 4/2007 | Bouda et al. | |
| 2007/0092251 A1 | 4/2007 | Bouda et al. | |
| 2007/0092252 A1 | 4/2007 | Bouda et al. | |
| 2007/0092253 A1 | 4/2007 | Bouda et al. | |
| 2007/0092254 A1 | 4/2007 | Bouda | |
| 2007/0092255 A1 | 4/2007 | Bouda | |
| 2007/0166037 A1 | 7/2007 | Bouda | |
| 2007/0166043 A1 | 7/2007 | Bouda | |
| 2007/0183779 A1 | 8/2007 | Bouda | |
| 2007/0280690 A1 | 12/2007 | Bouda | |
| 2007/0280691 A1 | 12/2007 | Bouda | |
| 2010/0021161 A1* | 1/2010 | Endo et al. | 398/45 |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-µm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. 1, Jan. 1991, pp. 113-120.

Lin, "Passive Optical Subscriber Loops with Multiaccess," Journal of Lightwave Technology, vol. 7, No. 11, Nov. 1989, pp. 1769-1777.

MOOG Component Group, "(Mems)* Singlemode Fiber Optic Switch," FO5935, 2 pages, 2005.

Light Reading—Networking the Telecom Industry, PON & FTTx Update, Introduction, Aug. 8, 2005, *Light Reading*, Aug. 8, 2005, printed from web site Jan. 26, 2006, pp. 1-11.

ITU-T Telecommunication Standardization Sector of ITU-T, G.984.1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.

ITU-T Telecommunication Standardization Sector of ITU-T, 6.983.1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.

ITU-T Telecommunication Standardization Sector of ITU-T, G.983.3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.

ITU-T Telecommunication Standardization Sector of ITU-T, G.984.3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

ITU-T Telecommunication Standardization Sector of ITU-T, G.984.3, Series G: Study Period 2005-2008, Updated Revised Amendment I, : "Amendment to Gigabit-Capable Passive Optical Network (G-PON): Transmission Convergence Layer Specification (2004)," pp. 1-39, May 16-27, 2005.

Green, Paul E. Jr., Telecommunications Consultant, "Fiber-to-the-Home White Paper,", Feb. 21, 2003, pp. 1-21.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15, 2001 through Oct. 26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999.

Zang et al., et al., "A Review of Routing and Wavelength Assignment Approaches for Wavelength-Routed Optical WDM Networks," Optical Networks Magazine, SPIE, Bellingham, WA, US, vol. 1, No. 1, pp. 47-60, Jan. 1, 2000.

Langer et al., "Promising Evolution Paths for Passive Optical Access Networks," 2004 IEEE, Proceedings of 2004 6th International Conference on Warsaw, Piscataway, NJ, vol. 1, pp. 202-207, Jul. 4, 2004.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, mailed Feb. 14, 2007, 14 pages.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Bouda, "A Hybrid Passive Optical Network Using Shared Wavelengths," filed Feb. 3, 2006, 65 pages, 9 drawings, U.S. Appl. No. 11/347,434, Pending.

Bouda, "A Distribution Node for a Wavelength-Sharing Network," filed Feb. 3, 2006, 64 pps., 9 drawings, U.S. Appl. No. 11/347,612, Pending.

Bouda et al., "Distribution Components for a Wavelength-Sharing Network," filed Feb. 3, 2006, 69 pages, 9 drawings, U.S. Appl. No. 11/347,585, Pending.

Bouda et al., "Upgradeable Passive Optical Network," filed Feb. 3, 2006, 66 pages, 9 drawings, U.S. Appl. No. 11/347,446, Pending.

Palacharla et al., "System and Method for Managing Network Components in a Hybrid Passive Optical Network," filed Oct. 25, 2006, 43 pages, 4 drawings, U.S. Appl. No. 11/552,696, Pending.

Bouda, "System and Method for Transmitting Traffic in a Plurality of Passive Optical Networks," filed Jan. 26, 2007, 35 pages., 5 drawings, U.S. Appl. No. 11/627,793, Pending.

Bouda, "System and Method for Transmitting Upstream Traffic in an Optical Network," filed Jun. 27, 2006, 49 pages., 5 drawings., U.S. Appl. No. 11/426,875, Pending.

Bouda, "Method and System for Managing Power in an Optical Network," filed Feb. 28, 2007, 35 pages, 6 drawings, U.S. Appl. No. 11/680,186, Pending.

Bouda, "System and Method for Managing Different Transmission Architectures in a Passive Network," 42 pages, 4 drawings, filed Jan. 26, 2007, U.S. Appl. No. 11/627,809, Pending.

Bouda, "System and Method for Distributing Traffic in an Optical Network, filed Jun. 27, 2006, ,"43 pages, 5 drawings, U.S. Appl. No. 11/426,879, Pending.

Akasaka et al., "System and Method for Traffic Distribution in an Optical Network," filed Jun. 27, 2006, 71 pps, 12 drawings, U.S. Appl. No. 11/426,884, Pending.

Bouda et al., "Method and System for Increasing Downstream Bandwidth in an Optical Network," filed Jan. 5, 2007, 42 pages, 10 drawings, U.S. Appl. No. 11/620,144, Pending.

Bouda, "Distribution Node for an Optical Network," filed Jan. 4, 2007, 38 pps., 6 drawings, U.S. Appl. No. 11/619,945, Pending.

Akasaka et al., "System and Method for Protecting an Optical Network," filed Dec. 11, 2006, 42 pages, 4 drawings, U.S. Appl. No. 11/609,120, Pending.

Bouda et al., "System and Method for Extending Reach in a Passive Optical network," filed Jan. 31, 2007, 51 pages, 5 drawings, U.S. Appl. No. 11/669,657, Pending.

Bouda, "System and Method for Transmitting Optical Markers in a Passive Optical Network System," 52 pages, 5 pp. drawings, filed Jan. 31, 2007, U.S. Appl. No. 11/669,677, Pending.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

* cited by examiner

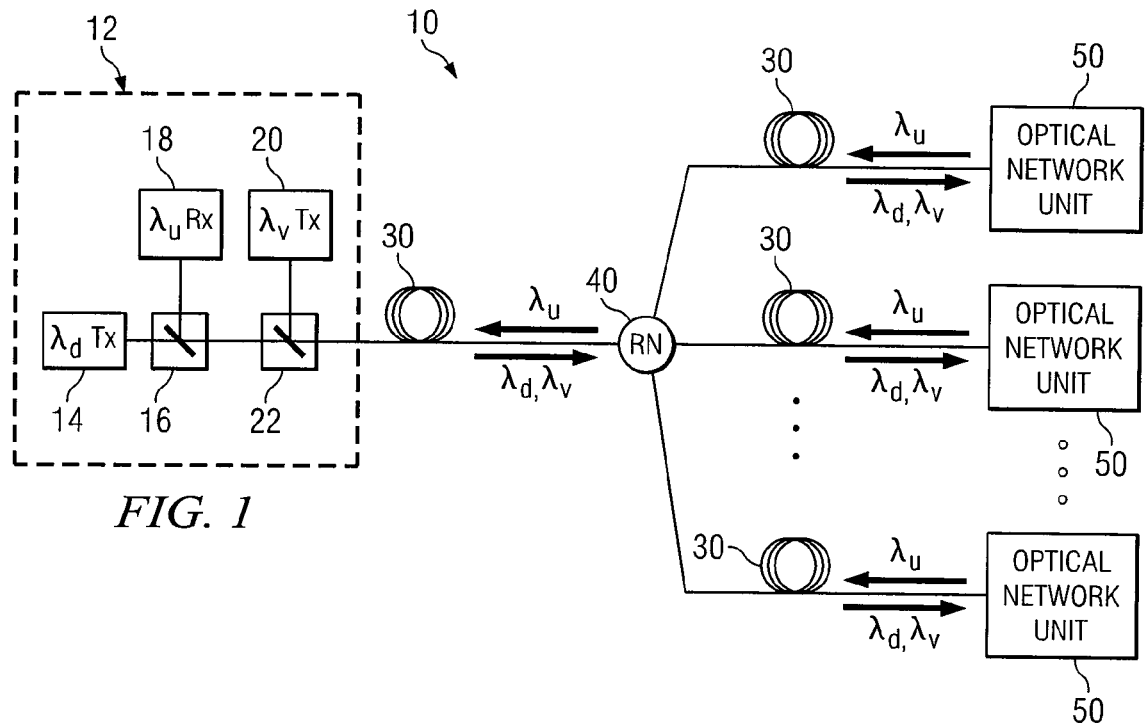

FIG. 1

| TRANSMITTER TXIF NUMBER | RECEIVER RXIF NUMBER | ONU SERIAL NUMBER | ONU-ID | OMCC PORT-ID | PORT-ID (SERVICES) |
|---|---|---|---|---|---|
| $T_1$ | $R_1$ | $SN_{aa1}$ | $ONU_{aa1}$ | $OMCC_{aa1}$ | $P_{aa1x}, P_{aa1y}, P_{aa1z},....$ |
| | $R_1$ | $SN_{aa2}$ | $ONU_{aa2}$ | $OMCC_{aa2}$ | $P_{aa2x}, P_{aa2y}, P_{aa2z},....$ |
| | $R_2$ | $SN_{ab3}$ | $ONU_{ab3}$ | $OMCC_{ab3}$ | $P_{ab3x}, P_{ab3y}, P_{ab3z},....$ |
| | ⋮ | ⋮ | ⋮ | ⋮ | ⋮ |
| | $R_N$ | $SN_{aNn}$ | $ONU_{aNn}$ | $OMCC_{aNn}$ | $P_{aNnx}, P_{aNny}, P_{aNnz},....$ |
| ⋮ | ⋮ | ⋮ | ⋮ | ⋮ | ⋮ |
| $T_M$ | $R_1$ | $SN_{Ma1}$ | $ONU_{Ma1}$ | $OMCC_{Ma1}$ | $P_{Ma1x}, P_{Ma1y}, P_{Ma1z},....$ |
| | $R_2$ | $SN_{Mb2}$ | $ONU_{Mb2}$ | $OMCC_{Mb2}$ | $P_{Mb2x}, P_{Mb2y}, P_{Mb2z},....$ |
| | $R_2$ | $SN_{Mb3}$ | $ONU_{Mb3}$ | $OMCC_{Mb3}$ | $P_{Mb3x}, P_{Mb3y}, P_{Mb3z},....$ |
| | ⋮ | ⋮ | ⋮ | ⋮ | ⋮ |
| | $R_N$ | $SN_{MNn}$ | $ONU_{MNn}$ | $OMCC_{MNn}$ | $P_{MNnx}, P_{MNny}, P_{MNnz},....$ |

FIG. 5

SYSTEM AND METHOD FOR MANAGING COMMUNICATION IN A HYBRID PASSIVE OPTICAL NETWORK

TECHNICAL FIELD

The present invention relates generally to communication systems and, more particularly, to a system and method for managing communication in a hybrid passive optical network.

BACKGROUND

In recent years, a bottlenecking of communication networks has occurred in the portion of the network known as the access network. Bandwidth on longhaul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GE-PONs).

Although PSPON systems provide increased bandwidth in access networks, demand continues to grow for higher bandwidth. One solution, wavelength division multiplexing PON (WDMPON), would increase downstream (and upstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand. Because demand for greater capacity continues to grow (but not at a rate to justify adoption of WDMPONs in most cases), a need exists for cost-efficient solutions along the upgrade path from PSPONs to full WDMPONs.

SUMMARY

In accordance with the teachings of the present invention, a system and method for managing communication in a hybrid passive optical network (HPON) is provided. In a particular embodiment, the method includes transmitting, at a first wavelength, a first configuration message on the HPON. The method also includes receiving at one or more of a plurality of receivers at an optical line terminal (OLT) one or more configuration response messages from one or more optical network units (ONUs) in a first set of ONUs. The method further includes, based on the configuration response messages from the first set of ONUs, associating, in a database, each ONU in the first set of ONUs with the first wavelength and with the receiver receiving the configuration response message from the ONU. The method also includes, after transmitting the first configuration message, transmitting, at a second wavelength, a second configuration message on the HPON. The method further includes receiving at one or more of the plurality of receivers at the OLT one or more configuration response messages from one or more ONUs in a second set of ONUs, wherein the ONUs in the second set of ONUs do not belong to the first set of ONUs. The method also includes, based on the configuration response messages from the second set of ONUs, associating, in the database, each ONU in the second set of ONUs with the second wavelength and with the receiver receiving the configuration response message from the ONU.

Technical advantages of one or more embodiments of the present invention may include using an auto-discovery of reachability scheme in an HPON to allow the OLT and ONUs in the HPON to communicate suitably. To allow such communication, in particular embodiments, the auto-discovery of reachability scheme may associate, at the OLT, particular transmitted downstream wavelengths with the one or more ONUs receiving traffic in the particular wavelengths. Such associations may be made one wavelength at a time in particular embodiments or concurrently for all wavelengths in alternative embodiments. In embodiments using multiple receivers at the OLT, each receiver may be associated with a corresponding set of one or more ONUs transmitting upstream traffic to that receiver. In particular embodiments, the associations among transmitters, ONUs, and receivers can be used by the OLT to create and transmit appropriate upstream bandwidth allocation map(s) to the ONUs.

In particular embodiments, the auto-discovery schemes used in the HPON may provide an efficient technique for determining reachability. In an upgrade to HPON from PSPON, an efficient auto-discovery scheme may be one that does not substantially deviate from the PSPON messaging scheme being upgraded. An efficient auto-discovery scheme may also be one, for example, that does not require substantial changes to PSPON components or to the PSPON architecture generally. As an example only, in an upgrade from GPON to HGPON, an efficient scheme for auto-discovery of ONU reachability may be one that does not substantially deviate from the G.984.3 GPON protocol and/or one that does not require changes to ONU hardware.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a diagram illustrating an example PSPON;

FIG. 5 is a diagram illustrating an example reachability table associated with the auto-discovery of reachability scheme of FIG. 4;

DETAILED DESCRIPTION

Figure 2:
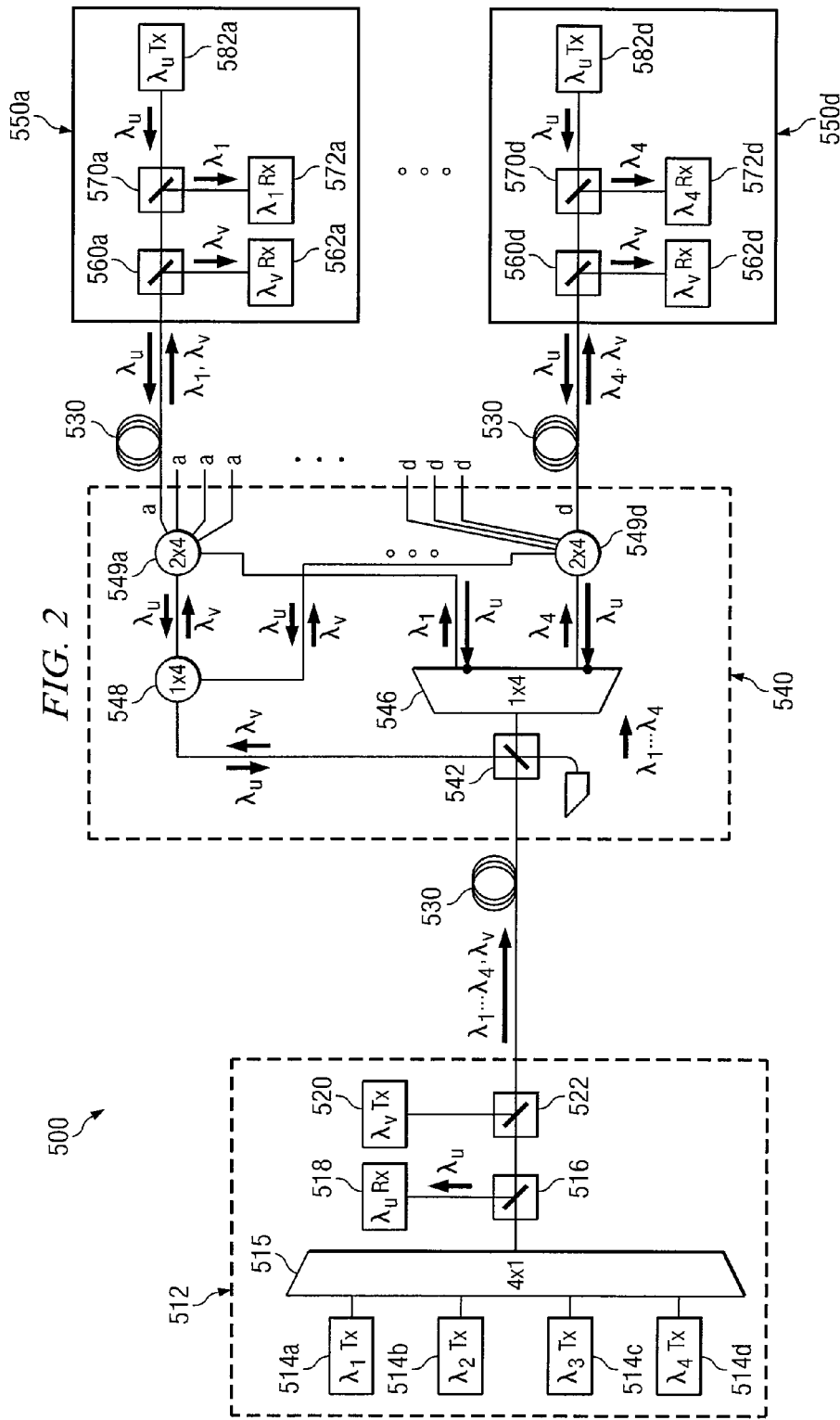
FIG. 2 is a diagram illustrating an example HPON.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (Gb/s) by using more powerful transmitters, provide even greater bandwidth.

Referring back to PSPON 10 of FIG. 1, PSPON 10 includes an Optical Line Terminal (OLT) 12, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 12, which may be an example of an upstream terminal, may reside at the carrier's central office, where it may be coupled to a larger communication network. OLT 12 includes a transmitter 14 operable to transmit traffic in a downstream wavelength, such as $\lambda_d$, for broadcast to all ONUs 50, which may reside at or near customer sites. OLT 12 may also include a transmitter 20 operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 12 also includes a receiver 18 operable to receive traffic from all ONUs 50 in a time-shared upstream wavelength, $\lambda_u$. OLT 12 may also comprise filters 16 and 22 to pass and reflect wavelengths appropriately.

It should be noted that, in typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. Also, downstream transmitters are typically more powerful than upstream transmitters, and thus, downstream reach is greater than upstream reach. It should also be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_u$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers.

RN 40 of PSPON 10 (which may also generally be referred to as a distribution node) comprises any suitable power splitter, such as an optical coupler, and connects OLT 12 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 12.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers and vice versa. Subscribers may include residential and/or commercial customers. Typically, PONs 10 have thirty-two ONUs 50 per OLT 12, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Also, the power of the ONU transmitter is typically less than the power of the OLT transmitter, and thus, upstream reach is less than downstream reach. Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, transmitter 14 of OLT 12 transmits downstream traffic for broadcast to ONUs 50 in $\lambda_d$. Transmitter 20 of OLT 12 may also transmit downstream analog video traffic for broadcast to ONUs 50 in $\lambda_v$. Traffic in $\lambda_d$ passes filter 16 and is combined with $\lambda_v$ at filter 22 (which passes $\lambda_d$ and reflects $\lambda_v$). The combined traffic then travels over optical fiber 30 to RN 40. RN 40 splits the downstream traffic into a suitable number of copies and forwards each copy to a corresponding ONU 50. Each ONU 50 receives a copy of the downstream traffic in $\lambda_d$ and $\lambda_v$ and processes the signal. Suitable addressing schemes may be used to identify which traffic is destined for which ONU 50.

In the upstream direction, each ONU 50 may transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal (at, e.g., the RN's power splitter). RN 40 then forwards the combined traffic over fiber 30 to OLT 12. At OLT 12, the combined traffic is passed by filter 22 and reflected by filter 16 to receiver 18. Receiver 18 receives the signal and processes it.

Figure 3:
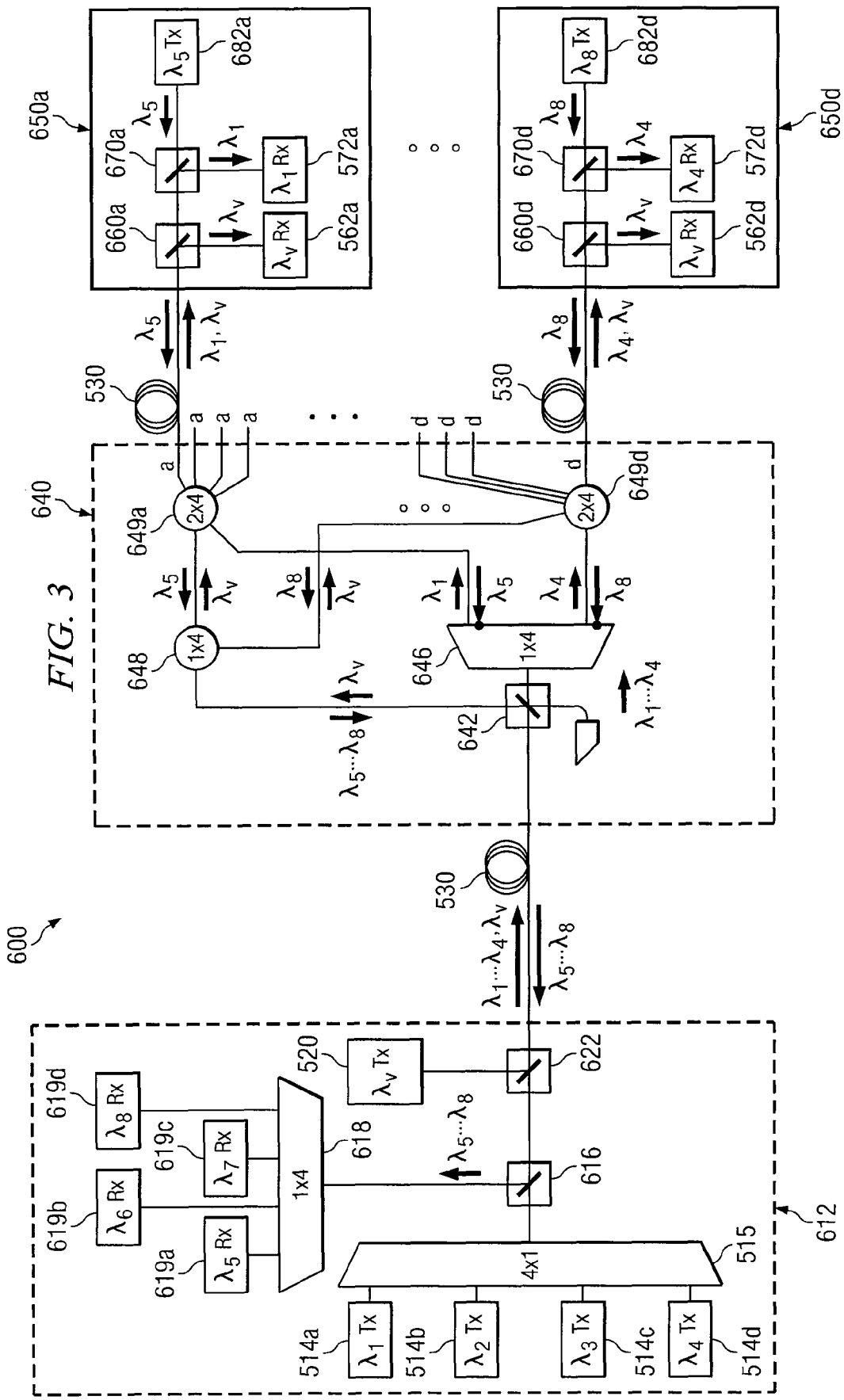
FIG. 3 is a diagram illustrating an example HPON transmitting at multiple upstream wavelengths.

One current limitation of typical PSPONs is their limited upstream bandwidth. Increased upstream bandwidth can be provided in hybrid PONs (HPONs), hybrids between PSPONs and WDMPONs, that transmit at multiple upstream wavelengths. FIG. 2 illustrates an example HPON, and FIG. 3 illustrates an example HPON transmitting at multiple upstream wavelengths.

FIG. 2 is a diagram illustrating an example HPON 500. Example HPON 500 comprises OLT 512, optical fiber 530, RN 540, and ONUs 550. Example HPON 500 provides greater downstream capacity than a PSPON by having groups of two or more ONUs 550 share downstream WDM wavelengths. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON, as is illustrated) and an HPON that transmits downstream traffic in a unique wavelength for each ONU (retaining PSPON characteristics in the upstream direction).

OLT 512 (which may be an example of an upstream terminal) may reside at the carrier's central office and comprises transmitters 514, multiplexer 515, filter 516 and receiver 518, and transmitter 520 and filter 522. Each transmitter 514a-514d may comprise any suitable transmitter and is operable to transmit traffic over a corresponding wavelength, $\lambda_1$-$\lambda_4$, respectively.

It should be noted that, $\lambda_1$-$\lambda_4$ are used in HPON 500 for illustrative purposes only. Also, although four transmitters are illustrated in example HPON 500, any suitable number of transmitters may be included, transmitting traffic at any suitable number of wavelengths. It should also be noted that although example HPON 500 does not provide WDM for upstream traffic, it may be economical to implement transceivers (transmitter and receiver) in OLT 512, instead of only transmitters 514, in anticipation of a further upgrade to WDM upstream (e.g., an upgrade to particular embodiments of HPON 600 of FIG. 3).

Multiplexer 515 comprises any suitable multiplexer/demultiplexer (and may be considered a wavelength router) and is operable to combine the traffic in $\lambda_1$-$\lambda_4$ into one signal. In particular example networks, multiplexer 515 may comprise a cyclic multiplexer operable to receive and combine the traffic in more than one wavelength through each port. In other example networks, multiplexer 512 may be a typical N×1 multiplexer operable to receive only the traffic in one wavelength through each port.

Filter 516 comprises any suitable filter operable to receive the traffic in $\lambda_1$-$\lambda_4$ from multiplexer 515 and pass the traffic in $\lambda_1$-$\lambda_4$ to filter 522. In the upstream direction, filter 516 is operable to receive traffic in $\lambda_u$ and direct traffic in $\lambda_u$ to receiver 518. Receiver 518 may comprise any suitable receiver operable to receive and process upstream traffic from ONUs 550 carried over time-shared $\lambda_u$.

Transmitter 520 comprises any suitable transmitter and is operable to transmit traffic over $\lambda_v$ for eventual broadcast to all ONUs 550. Transmitter 520 is further operable to direct the traffic to filter 522. In particular embodiments, transmitter 520 may transmit analog video traffic over $\lambda_v$. In alternative embodiments, transmitter 520 may transmit digital data traffic. It should be noted that, although a single transmitter 520 is illustrated, OLT 512 may comprise any suitable number of transmitters operable to transmit traffic for eventual broadcast to all ONUs 550.

Filter 522 is operable to receive the traffic in $\lambda_v$ and the traffic in $\lambda_1$-$\lambda_4$ and combine the traffic. Filter 522 is also operable to direct the combined traffic over fiber 530 to RN 540. In the upstream direction, filter 522 is operable to receive traffic in $\lambda_u$ and direct the traffic in $\lambda_u$ to filter 516.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 512, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 512. It should be noted that although RN 540 is referred to as a remote node, "remote" refers to RN 540 being communicatively coupled to OLT 512 and ONUs 550 in any suitable spatial arrangement. A remote node may also generally be referred to as a distribution node.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 512.

Multiplexer 546 may comprise any suitable multiplexer/demultiplexer (and may be considered a wavelength router) and is operable to receive the signal comprising the traffic in $\lambda_1$-$\lambda_4$ and demultiplex the signal. Each output port of multiplexer 546 is operable to forward the traffic in a corresponding one of $\lambda_1$-$\lambda_4$ to a corresponding secondary power splitter 549a-549d, respectively. In the upstream direction, multiplexer 546 is operable to receive and terminate the traffic in $\lambda_u$, as ONUs 550 of example HPON 500 time-share $\lambda_u$ (and do not transmit traffic over multiple upstream wavelengths). Alternatively, multiplexer 546 may forward this traffic to filter 542 for suitable termination (where termination may be performed internally or externally).

It should be noted that multiplexer 546 may comprise a cyclic multiplexer or any other suitable type of multiplexer and may have any suitable number of ports. Also, although one multiplexer 546 is illustrated in remote node 540 of FIG. 2, in alternative remote nodes, multiplexer 546 may comprise two or more separate multiplexers receiving downstream signals from one or more upstream sources and forwarding the traffic downstream such that ONUs 550 share wavelengths. It should further be noted that the traffic in each wavelength may pass to a different secondary power splitter than that illustrated, the traffic in more than one wavelength may pass to a secondary power splitter, and/or multiplexer 546 may receive, multiplex, and pass traffic in less or more than four downstream wavelengths.

Primary power splitter 548 may comprise any suitable power splitter operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 512. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT. Each ONU 550 comprises a filter 560, receiver 562, filter 570, receiver 572, and transmitter 582. Each filter 560 may comprise any suitable filter operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver operable to receive the traffic transmitted in $\lambda_v$ and process the traffic. Each filter 570 may comprise any suitable filter operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter operable to transmit traffic over $\lambda_u$ in the upstream direction, applying a suitable protocol to time-share $\lambda_u$ with the other ONUs 550.

It should be noted that although four ONUs 550 are illustrated as being part of a group of ONUs 550 in HPON 500, any suitable number of ONUs 550 may be part of a group sharing a downstream wavelength. In addition, there may be multiple groups each sharing a different downstream wavelength. For example, ONUs 550a may share $\lambda_1$, ONUs 550b (not illustrated) may share $\lambda_2$, ONUs 550c (not illustrated) may share $\lambda_3$, and ONUs 550d may share $\lambda_4$. Also, one or more ONUs 550 may be a part of more than one group in some networks. It should also be noted that any suitable number of ONUs 550 may be implemented in the network.

In operation, transmitters 514a-514d of OLT 512 transmit traffic at $\lambda_1$-$\lambda_4$, respectively, and forward the traffic to multiplexer 515. Multiplexer 515 combines the traffic in the four wavelengths into one signal and forwards the signal to filter 516. Filter 516 passes the downstream signal to filter 522. Transmitter 20 of OLT 512 also transmits traffic at $\lambda_v$ and forwards the traffic to filter 522. Filter 522 receives the traffic in $\lambda_1$-$\lambda_4$ and $\lambda_v$ and directs the traffic over optical fiber 530 to RN 540.

Filter 542 of RN 540 receives the signal and directs the traffic in $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$.

Each secondary power splitter 549 thus receives a copy of traffic in $\lambda_v$ from primary power splitter 548 and traffic in a corresponding one of $\lambda_1$-$\lambda_4$ from multiplexer 546, combines the traffic into one signal, and splits the signal into a suitable number of copies. In the illustrated embodiment, each secondary power splitter 549 splits the signal into four copies. In this way, the traffic in $\lambda_v$ is broadcast to all ONUs 550 and a corresponding one of $\lambda_1$-$\lambda_4$ is transmitted to and shared by one or more groups of ONUs 550. In the illustrated embodiment, ONUs 550a share $\lambda_1$, ONUs 550b (not illustrated) share $\lambda_2$, ONUs 550c (not illustrated) share $\lambda_3$, and ONUs 550d share $\lambda_4$. It should be noted again that the groups of ONUs 550 sharing a wavelength may be different than those illustrated in FIG. 2, and groups of wavelength-sharing ONUs 550 may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (e.g., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs 550 does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 512. Fiber 530 carries the traffic in $\lambda_u$ to filter 522 of OLT 512. Filter 522 receives the traffic in $\lambda_u$ and passes the traffic to filter 516. Filter 516 receives the traffic in $\lambda_u$ and directs the traffic toward receiver 518. Receiver 518 receives the traffic and processes it.

FIG. 3 is a diagram illustrating an example HPON 600 transmitting at multiple upstream wavelengths. HPON 600 comprises OLT 612, fiber 530, RN 640, and ONUs 650. ONUs 650 may provide increased upstream bandwidth by time-sharing transmission of upstream traffic in a plurality of wavelengths, $\lambda_5$-$\lambda_8$. RN 640 routes this traffic through primary power splitter 648 (or, in alternative embodiments, through a multiplexer at RN 640). OLT 612 demultiplexes $\lambda_5$-$\lambda_8$ at demultiplexer 618 and receives the traffic in $\lambda_5$-$\lambda_8$ at receivers 619a-619d, respectively.

OLT 612 (which may be an example of an upstream terminal) may reside at the carrier's central office and comprises transmitters 514, multiplexer 515, transmitter 520, filter 616, demultiplexer 618, receivers 619a-619d, and filter 622. Transmitters 514, multiplexer 515, and transmitter 520 have been described above in conjunction with FIG. 2 and thus will not be described again. It should be noted that, in particular embodiments, OLT 612 may also comprise any suitable amplifier (not illustrated) operable to increase the reach of downstream traffic.

Demultiplexer 618 comprises any suitable multiplexer/demultiplexer (and may be considered a wavelength router) and is operable to demultiplex the signal comprising $\lambda_5$-$\lambda_8$ into its constituent wavelengths. Each receiver 619a-619d comprises any suitable receiver operable to receive the traffic in a corresponding one of $\lambda_5$-$\lambda_8$. In particular embodiments, an ONU 650 of two or more sets of ONUs 650a-650d may transmit upstream traffic at $\lambda_5$-$\lambda_8$, respectively, in the same time-slot, which may be multiplexed at primary power splitter 648 of RN 640, as described further below. In such embodiments, demultiplexer 618 may demultiplex $\lambda_5$-$\lambda_8$ and forward traffic in each wavelength to a corresponding receiver, one of receivers 619a-619d.

It should be noted that $\lambda_5$-$\lambda_8$ may (but need not) be the same as $\lambda_1$-$\lambda_4$ transmitted in the downstream direction in FIGS. 2 and/or 3. It should also be noted that, in particular embodiments, receivers 619 and transmitters 514 may be part of transceivers, and the illustrated PON architecture may be modified in any suitable manner to support such a configuration. It should further be noted that receivers 619 may comprise one or more non-discriminating, spectrally broadband receivers in particular embodiments. Also, in particular embodiments, any suitable number of upstream wavelengths may be transmitted, including, for example, a unique upstream wavelength for each ONU 650 (and HPON 600 may be modified in any suitable manner to support such transmission).

Filter 616 is operable to receive the traffic in $\lambda_1$-$\lambda_4$ from multiplexer 515 and direct the traffic to filter 622. In the upstream direction, filter 616 is operable to receive the traffic in any one or more of $\lambda_5$-$\lambda_8$ from filter 622 and direct the traffic to demultiplexer 618. Filter 622 is operable to receive the traffic in $\lambda_1$-$\lambda_4$ from filter 616 and the traffic in $\lambda_v$ from transmitter 520, combine the traffic, and forward the traffic to RN 640. In the upstream direction, filter 622 is operable to receive the traffic in any one or more of $\lambda_5$-$\lambda_8$ from RN 640 and direct the traffic to filter 616. Optical fiber 530 has been described above in conjunction with FIG. 2 and thus will not be described again.

RN 640 comprises filter 642, multiplexer 646, primary power splitter 648, and secondary power splitters 649a-649d. RN 640 is operable to receive the traffic in $\lambda_1$-$\lambda_4$ and $\lambda_v$ from OLT 612, filter out and broadcast the traffic in $\lambda_v$, and demultiplex and forward the traffic in $\lambda_1$-$\lambda_4$ to the ONUs in corresponding groups of wavelength-sharing ONUs 650a-650d, respectively. In the upstream direction, RN 640 is operable to receive the traffic in $\lambda_5$-$\lambda_8$ from ONUs 650a-650d, respectively, at primary power splitter 648 and forward this traffic to OLT 612. It should be noted that although RN 640 is referred to as a remote node, "remote" refers to RN 640 being communicatively coupled to OLT 612 and ONUs 650 in any suitable spatial arrangement. A remote node may also generally be referred to as a distribution node.

Filter 642 may comprise any suitable filter operable to receive a signal comprising traffic in $\lambda_1$-$\lambda_4$ and $\lambda_v$ from OLT 612, direct the traffic in $\lambda_1$-$\lambda_4$ to multiplexer 646, and direct the traffic in $\lambda_v$ to primary power splitter 648. In the upstream direction, filter 642 is operable to receive the traffic in $\lambda_5$-$\lambda_8$ from primary power splitter 648 (and optionally from multiplexer 646) and forward the traffic in $\lambda_5$-$\lambda_8$ to OLT 612 (and suitably terminate the traffic from multiplexer 646, internally or externally). Although filter 642 comprises a single filter in the illustrated embodiment, in alternative embodiments, filter 642 may comprise any suitable number of filters (coupled to optional switches) to facilitate an upgrade of the network (e.g., an upgrade in capacity).

Multiplexer 646 may comprise any suitable multiplexer/demultiplexer (and may be considered a wavelength router) and is operable to receive the downstream signal comprising the traffic in $\lambda_1$-$\lambda_4$ and demultiplex the signal. Each output port of multiplexer 646 is operable to forward the traffic in a corresponding one of $\lambda_1$-$\lambda_4$ to a corresponding secondary power splitter 649a-649d, respectively. In the upstream direction, multiplexer 646 is operable to receive the traffic in $\lambda_5$-$\lambda_8$ from secondary power splitters 649a-649d, respectively, and terminate this traffic (or forward this traffic to filter 642 for suitable termination).

It should be noted that multiplexer 646 may comprise a cyclic multiplexer or any other suitable type of multiplexer and may have any suitable number of ports. Also, although one multiplexer 646 is illustrated in remote node 640, in alternative remote nodes, multiplexer 646 may comprise two or more separate multiplexers receiving downstream signals from one or more upstream sources and forwarding the traffic downstream such that ONUs 650 share wavelengths. It should further be noted that the traffic in each wavelength may pass to a different secondary power splitter than that illustrated, the traffic in more than one wavelength may pass to a secondary power splitter, and/or multiplexer 646 may receive, multiplex, and pass traffic in less or more than four downstream wavelengths. In particular embodiments, multiplexer 646 may be the same as multiplexer 546 of FIG. 2.

Primary power splitter 648 may comprise any suitable power splitter operable to receive the traffic in $\lambda_v$ from filter 642 and split the traffic into four copies. The power of each copy may be less than one-fourth of the power of the original signal $\lambda_v$. Primary power splitter 648 is operable to forward each copy to a corresponding secondary power splitter 649. In the upstream direction, primary power splitter 648 is operable to receive traffic transmitted by ONUs 650 over $\lambda_5$-$\lambda_8$ from secondary power splitters 649, combine this traffic into one signal, and forward the signal to filter 642. Primary power splitter 648 thus broadcasts downstream traffic in $\lambda_v$ and combines and forwards upstream traffic in $\lambda_5$-$\lambda_8$. It should be noted that, because primary power splitter 648 (and not a multiplexer) combines upstream traffic in $\lambda_5$-$\lambda_8$, each ONU in sets 650a-650d may transmit at any one of $\lambda_5$-$\lambda_8$. Thus, for example, in particular embodiments, ONUs sharing a particular downstream wavelength (e.g., ONUs 650a) may transmit at different upstream wavelengths (e.g., any two or more of $\lambda_5$-$\lambda_8$). In alternative embodiments, these ONUs may transmit at the same upstream wavelength (e.g., $\lambda_5$). Although primary power splitter 648 is illustrated as a 1×4 power splitter, any suitable power splitter may be used in alternative embodiments.

Each secondary power splitter, one of 649a-649d, may comprise any suitable power splitter, such as an optical coupler, operable to receive a copy of downstream traffic in $\lambda_v$ from primary power splitter 648 and traffic in a corresponding one of $\lambda_1$-$\lambda_4$ from multiplexer 646, combine the traffic in $\lambda_v$ and $\lambda_1$-$\lambda_4$, split the combined traffic into a suitable number of copies, and forward each resulting copy to a corresponding set of ONUs 650. In the upstream direction, each secondary power splitter 649 is operable to receive traffic in any one of $\lambda_5$-$\lambda_8$ from each downstream ONU 650 and combine the traffic into one signal. Each secondary power splitter 649 is operable to split the combined upstream traffic into two copies and forward a first copy to primary power splitter 648 and a second copy to multiplexer 646. The copy forwarded to primary power splitter 648 may be combined at splitter 648 with traffic from other secondary power splitters 649 and forwarded to filter 642. The copy forwarded to multiplexer 646 may be terminated or forwarded to filter 642 for termination. Although secondary power splitters 649 comprise 2×4 couplers in the illustrated embodiment, in alternative embodiments, secondary power splitters 649 may comprise any other suitable couplers or combination of couplers. Secondary power splitters 649 may split or combine any suitable number of signals and may reside in any suitable location in HPON 600.

Each ONU 650 (which may be an example of a downstream terminal) may comprise any suitable ONU or ONT. Each ONU 650 comprises receivers 562 and 572, filters 660 and 670, and transmitter 682. Receivers 562 and 572 have been described above in conjunction with FIG. 2 and thus will not be described again in detail. Each filter 660 may comprise any suitable filter operable to direct downstream traffic in $\lambda_v$ to receiver 562. Filter 660 is also operable to pass the traffic in a corresponding one of $\lambda_1$-$\lambda_4$ to filter 670. In the upstream direction, each filter 660 is operable to receive the traffic in a corresponding one of $\lambda_5$-$\lambda_8$ from a corresponding filter 670 and direct the traffic to RN 640.

Each filter 670 may comprise any suitable filter operable to receive the traffic in a corresponding one of $\lambda_1$-$\lambda_4$ from a corresponding filter 660 and direct the traffic to a corresponding receiver 572. In the upstream direction, each filter 670 is further operable to receive the traffic in a corresponding one of $\lambda_5$-$\lambda_8$ from a corresponding transmitter 682 and direct the traffic to a corresponding filter 660.

Each transmitter 682 may comprise any suitable transmitter operable to transmit traffic at a corresponding one of $\lambda_5$-$\lambda_8$ in the upstream direction. ONUs 650 transmitting at $\lambda_5$ time-share transmission at $\lambda_5$, ONUs 650 transmitting at $\lambda_6$ time-share transmission at $\lambda_6$ (not illustrated), ONUs 650 transmitting at $\lambda_7$ time-share transmission at $\lambda_7$ (not illustrated), and ONUs transmitting at $\lambda_8$ time-share transmission at $\lambda_8$. It should be noted that any suitable number of ONUs 650 may be part of a group sharing an upstream wavelength. It should also be noted that any suitable number of ONUs 650 may be implemented in the network.

In operation, in the downstream direction, transmitters 514a-514d and 520 at OLT 612 transmit traffic at $\lambda_1$-$\lambda_4$ and $\lambda_v$, respectively. Multiplexer 515 combines the traffic in $\lambda_1$-$\lambda_4$ and forwards the combined traffic to filter 616. Filter 616 receives the traffic in $\lambda_1$-$\lambda_4$ and forwards the traffic to filter 622. Filter 622 receives the traffic in $\lambda_1$-$\lambda_4$ from filter 616 and the traffic in $\lambda_v$ from transmitter 520, combines the traffic into one signal, and forwards the signal over fiber 530 to RN 640. Filter 642 of RN 640 receives the traffic in $\lambda_1$-$\lambda_4$ and $\lambda_v$, directs the traffic in $\lambda_v$ to primary power splitter 648, and directs the traffic in $\lambda_1$-$\lambda_4$ to multiplexer 646. Primary power splitter 648 receives the traffic in $\lambda_v$ and splits it into a suitable number of copies. In the illustrated embodiment, primary power splitter 648 splits the traffic in $\lambda_v$ into four copies and forwards each copy to a corresponding secondary power splitter 649. Multiplexer 646 receives the signal comprising the traffic in $\lambda_1$-$\lambda_4$ and demultiplexes the signal into its constituent wavelengths. Multiplexer 646 then directs the traffic in $\lambda_1$-$\lambda_4$ to secondary power splitters 649a-649d, respectively.

Each secondary power splitter 649 receives a copy of traffic in $\lambda_v$ from primary power splitter 648 and traffic in a corresponding one of $\lambda_1$-$\lambda_4$ from multiplexer 646, combines the traffic into one signal, splits the signal into a suitable number of copies, and forwards each copy to a downstream ONU 650. In the illustrated embodiment, each secondary power splitter 649 splits the signal into four copies and forwards the four copies to downstream ONUs 450.

In this manner, the traffic in $\lambda_v$ is broadcast to all ONUs 650 and a corresponding one of $\lambda_1$-$\lambda_4$ is transmitted to and shared by a group of ONUs 650. In the illustrated embodiment, ONUs 650a share $\lambda_1$, ONUs 650b (not illustrated) share $\lambda_2$, ONUs 650c (not illustrated) share $\lambda_3$, and ONUs 650d share $\lambda_4$. It should be noted that, in alternative embodiments, the groups of ONUs 650 sharing a particular wavelength may be different than those illustrated in FIG. 3, and groups of wavelength-sharing ONUs 650 may share more than one WDM wavelength.

Filter 660 of each ONU 650 receives a copy of the traffic in $\lambda_v$ and a corresponding one of $\lambda_1$-$\lambda_4$ from a corresponding secondary power splitter 649. Filter 660 then directs the traffic in $\lambda_v$ to receiver 562 (which then processes the traffic) and directs the traffic in the corresponding one of $\lambda_1$-$\lambda_4$ to filter 670. Filter 670 receives the traffic in the corresponding one of $\lambda_1$-$\lambda_4$ and directs the traffic to receiver 572 which then processes the traffic. Again, since each ONU 650 in a group may share one of $\lambda_1$-$\lambda_4$ with other ONUs 650 in the group, ONUs 650 may apply a suitable addressing protocol to process downstream traffic appropriately (e.g., to determine which portion of the traffic transmitted in the corresponding wavelength is destined for which ONU 650 in a group).

In the upstream direction, each ONUs 650 time-shares transmission at a corresponding one of $\lambda_5$-$\lambda_8$. In particular embodiments, traffic in two or more of $\lambda_5$-$\lambda_8$ is transmitted by multiple ONUs 650 in a particular time-slot. Each secondary power splitter 649 receives any corresponding upstream traffic, splits the received traffic into two copies and forwards one copy to multiplexer 646 and one copy to primary power splitter 648. Multiplexer 646 terminates any received traffic (or forwards the traffic to filter 642 for suitable termination). Primary power splitter 648 receives copies of the traffic in $\lambda_5$-$\lambda_8$ from secondary power splitters 649, combines the traffic into one signal (when traffic in a plurality of $\lambda_5$-$\lambda_8$ is transmitted per time-slot), and forwards the traffic to filter 642. Filter 642 receives the traffic in the particular set of $\lambda_5$-$\lambda_8$ from primary power splitter 648 and forwards the traffic to OLT 612 (and optionally terminates any traffic from multiplexer 646).

Filter 622 of OLT 612 receives the traffic in the particular set of $\lambda_5$-$\lambda_8$ and directs the traffic to filter 616. Filter 616 receives the traffic in the particular set of two or more wavelengths and forwards the traffic to demultiplexer 618. Demultiplexer 618 demultiplexes the wavelengths and forwards the traffic in each wavelength to a corresponding receiver 619. Each receiver 619 receives its corresponding traffic and processes it.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

In upgrading to an HPON transmitting at multiple upstream wavelengths, network operators may be required to upgrade the legacy messaging scheme due to the upgraded HPON architecture. For example, unlike in a PSPON, in an example HPON transmitting at multiple upstream wavelengths, the OLT assigns particular downstream wavelengths to one or more ONUs and may receive upstream traffic from particular ONUs at particular receivers. Under such conditions, the PSPON messaging scheme may not properly provide for discovery, ranging, upstream bandwidth allocation, and routing of upstream and downstream traffic, as discussed further below. Thus, an upgrade from a PSPON messaging scheme may be required.

In upgrading the legacy messaging scheme, network operators may also desire an efficient solution. An efficient messaging scheme may be one, for example, that does not substantially deviate from the PSPON messaging scheme being upgraded, thereby reducing software and/or hardware modifications. An efficient messaging scheme may also be one that does not require substantial changes to network components. As an example only, in an upgrade from GPON to HGPON, an efficient messaging scheme for auto-discovery of ONU reachability may be one that does not substantially deviate from the G.984.3 GPON protocol and/or one that does not require changes to ONU hardware. Analogous auto-discovery schemes may also be efficient in other PSPON upgrade contexts, such as, for example, in upgrades from BPONs or GEPONs.

Typically, ONUs in a GPON are installed and activated according to a GPON protocol known as the ITU-T G.984.3 protocol. The protocol provides for the automatic discovery and ranging of ONUs in the network and for ONU management and control channel (OMCC) setup using physical layer operations, administration, and maintenance (PLOAM) messaging. Specifically, to activate a newly connected ONU under the protocol, the OLT discovers the serial number of the newly connected ONU. The OLT does so by transmitting an ONU serial number request message to all of the downstream ONUs. The newly connected ONU responds to the OLT message by reporting its serial number to the OLT.

After discovering the serial numbers of the newly connected ONU, the OLT assigns an ONU-ID to the ONU, measures the arrival phase of upstream transmission from the ONU, notifies the ONU of the equalization delay (allowing the ONU to adjust upstream transmission with the notified delay value), and configures the OMCC to each ONU using the "Configure Port-ID" PLOAM message. Because the ITU-T G.984.3 protocol cannot, without modification, enable the use of multiple downstream WDM wavelengths, the association of particular subsets of one or more ONUs with particular downstream wavelengths, and the association of particular subsets of one or more ONUs with particular OLT receivers, the unmodified protocol cannot be used in an HGPON to route downstream traffic to the appropriate ONU or to allocate upstream bandwidth among the ONUs. Thus, a different messaging scheme is needed to install and activate ONUs in an HGPON transmitting at multiple upstream wavelengths.

To install and activate ONUs efficiently in an HPON transmitting at multiple upstream wavelengths, in particular embodiments, a messaging scheme may be used that associates, at the OLT, particular transmitted wavelengths with the one or more ONUs receiving traffic in the particular wavelengths and also associates, at the OLT, particular OLT receivers with the one or more ONUs transmitting traffic to those receivers. It should be noted that, in particular embodiments, a set of ONUs receiving traffic in a particular downstream wavelength from a particular OLT transmitter need not all transmit upstream traffic at a single wavelength to a single OLT receiver. Thus, some of these ONUs may transmit upstream traffic in one wavelength to one OLT receiver and others of these ONUs may transmit upstream traffic in another wavelength to another OLT receiver.

Generally, such associations among OLT transmitters, ONUs, and OLT receivers may be initially established using either a sequential auto-discovery of reachability scheme or a simultaneous auto-discovery of reachability scheme. A sequential auto-discovery scheme generally refers to the OLT automatically discovering, in sequence for each downstream WDM wavelength, each set of one or more ONUs sharing a particular downstream wavelength. In particular embodiments, discovery may be initiated for one downstream wavelength at a time. A simultaneous auto-discovery scheme generally refers to the OLT automatically discovering, in parallel for all downstream WDM wavelengths, the set of one or more ONUs sharing each downstream wavelength. In either case, in the HGPON context, only minor changes are made to the ITU-T G.984.3 protocol and/or to existing network components in particular embodiments, thereby providing an efficient solution. Each of these auto-discovery schemes is discussed further below.

Figure 4:
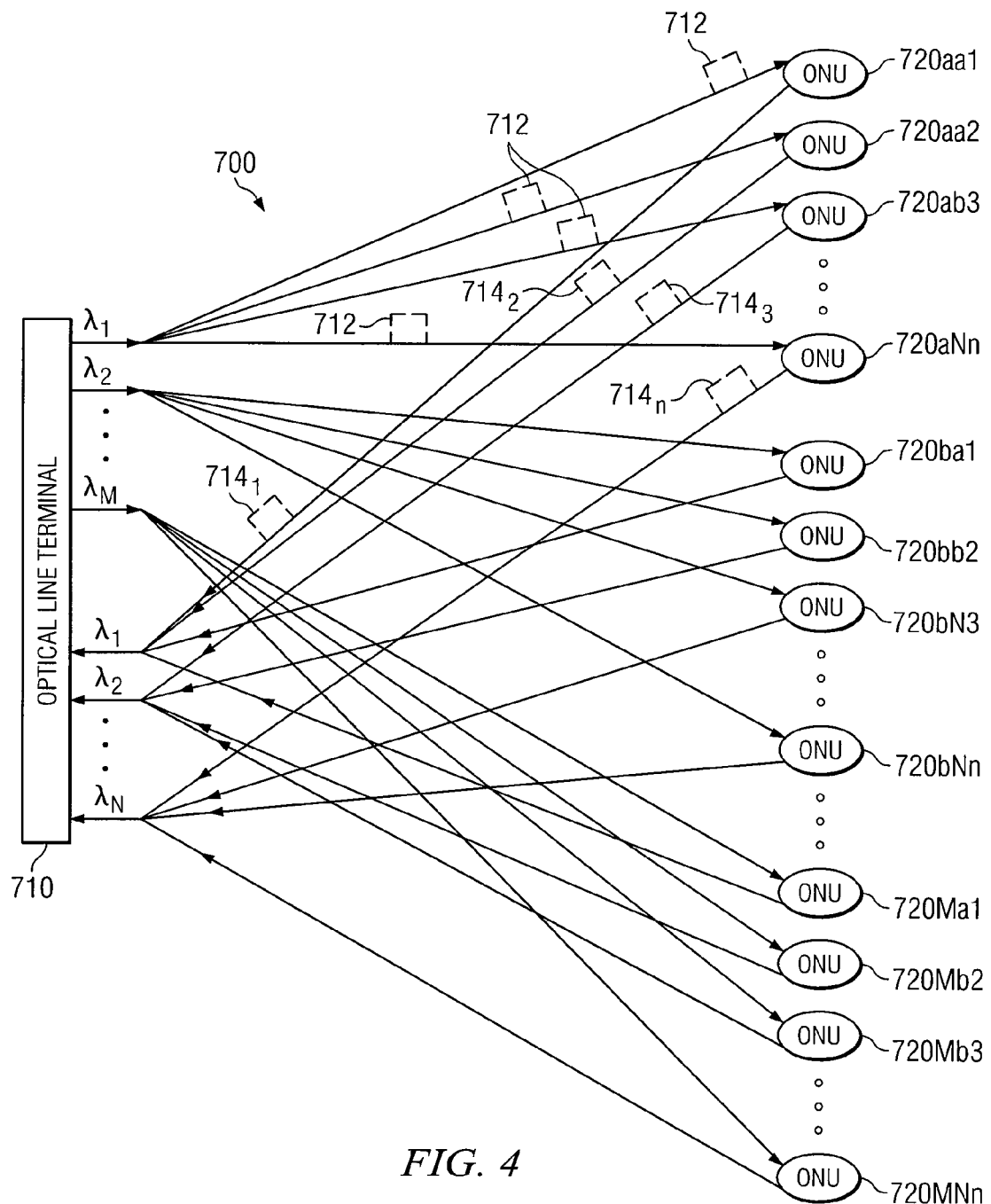
FIG. 4 is a diagram illustrating an auto-discovery of reachability scheme in an example HPON logical topology according to a particular embodiment of the invention.

FIG. 4 is a diagram illustrating an auto-discovery of reachability scheme in an example HPON logical topology 700 according to a particular embodiment of the invention. Topology 700 comprises OLT 710 and ONUs 720. In particular embodiments, OLT 710 and ONUs 720 may be the same as OLT 612 and ONUs 650, respectively, and thus will not be described again in detail. It should be noted that, for each $ONU_{ijk}$, "i" corresponds to the downstream wavelength being received by the ONU, "j" corresponds to the upstream wavelength being transmitted by the ONU, and "k" corresponds to the ONU number of an ONU in a set of ONUs sharing a downstream wavelength.

As can be observed, in the downstream direction, wavelengths transmitted by OLT 710 ($\lambda_1$-$\lambda_M$) are shared by particular groups of ONUs 720. For example, each $ONU_{ijk}$ where "i" equals "a" shares downstream $\lambda_1$, each $ONU_{ijk}$ where "i" equals "b" shares downstream $\lambda_2$, and each $ONU_{ijk}$ where "i" equals "M" shares downstream $\lambda_M$. In the upstream direction, sets of ONUs 720 transmit upstream traffic in particular wavelengths ($\lambda_1$-$\lambda_N$). For example, each $ONU_{ijk}$ where "j" equals "a" transmits upstream traffic in $\lambda_1$, each $ONU_{ijk}$ where "j" equals "b" transmits upstream traffic in $\lambda_2$, and each $ONU_{ijk}$ where "j" equals "N" transmits upstream traffic in $\lambda_N$.

It should be noted that, although some of the downstream and upstream wavelengths are illustrated with the same designation (e.g., $\lambda_1$ in the downstream and upstream directions), these may be the same or different wavelengths. Also, the number of downstream wavelengths "M" may be the same or different than the number of upstream wavelengths "N." Further, the sets of ONUs 720 sharing downstream and upstream wavelengths in FIG. 4 are illustrative. In alternative embodiments, any combination of zero, one, or more ONUs 720 from each set of ONUs 720 receiving downstream traffic in the same wavelength (e.g., zero, one or more of the ONUs in sets 720a, 720b, and 720M) may transmit upstream traffic in any suitable wavelength (e.g., in $\lambda_1$, $\lambda_2$, or $\lambda_N$). For example, in particular embodiments, all of the ONUs beginning with "720a" may transmit upstream traffic in the same wavelength (e.g., $\lambda_N$). Alternatively, only some of the ONUs beginning with "720a" may transmit upstream traffic in the same wavelength (as illustrated). Alternatively, each ONU beginning with "720a" may transmit upstream traffic in a different wavelength.

The scheme of FIG. 4 is an example of a sequential auto-discovery scheme. Each group of wavelength-sharing ONUs 720 is discovered serially by initiating discovery for one downstream wavelength at a time. Each downstream wavelength may correspond to a particular transmitter interface in particular embodiments. Initiating discovery from a single transmitter interface at a time may require synchronization among OLT transmitters in particular embodiments and thus minor modifications to the OLT may be needed to provide for synchronization control of the transmitters in this manner. However, using a sequential auto-discovery of reachability scheme may require no modification of the ITU-T G.984.3 message formats in particular embodiments.

In operation, to initiate discovery, OLT 710 transmits a downstream configuration message 712 (e.g., an ONU serial number request message such as a "SN-RQ-All" message with alloc-ID=254) at a first wavelength (e.g., $\lambda_1$) to a first set of one or more ONUs 720 (e.g., ONUs 720a). In particular embodiments, message 712 may be the same as the serial number request message used in the G.984.3 protocol. To avoid any collisions due to simultaneous responses from ONUs 720 in the upstream direction, in particular embodiments, OLT 710 transmits a configuration message with alloc-ID=255 or with no bandwidth allocation for upstream transmission (e.g., ZeroPointers) at the other downstream WDM wavelengths. The ONUs 720 receiving traffic in the first wavelength (e.g., ONUs beginning with "720a") respond to the request by reporting their serial numbers to OLT 710 in configuration messages $714_1$-$714_n$ (e.g., "SN-ONU" messages). These configuration messages 714 may be received at particular receivers at OLT 710. In particular embodiments, messages 714 may be the same as the serial number response messages used in the G.984.3 protocol. OLT 710 may then assign an ONU-ID to each reporting ONU 720 in particular embodiments. An ONU-ID may be used, for example, as an ONU identifier in messaging for control and management. OLT 710 may also tag, in any suitable manner, each reporting ONU's configuration message with the receiver receiving the ONU's response.

Using serial number discovery, OLT 710 associates each ONU in the first set of ONUs illustrated as beginning with "720a" with the first downstream wavelength $\lambda_1$ (or with the OLT transmitter transmitting at $\lambda_1$) and with the upstream wavelength in which the ONU's configuration message 714 is transmitted (or with the OLT receiver that receives the ONU's configuration message 714). Thus, OLT 710 associates ONU 720aa1 with downstream $\lambda_1$ and upstream $\lambda_1$, ONU 720aa2 with downstream $\lambda_1$ and upstream $\lambda_1$, ONU 720ab3 with downstream $\lambda_1$ and upstream $\lambda_2$, and ONU 720aNn with downstream $\lambda_1$ and upstream $\lambda_N$.

Since each downstream wavelength may correspond to a particular transmitter interface and each upstream wavelength may correspond to a particular receiver interface in particular embodiments, OLT 710 may associate the first set of ONUs beginning with "720a" with a first transmitter interface transmitting at $\lambda_1$ and may also associate each of these ONUs with the particular receiver interface receiving traffic from the ONU. In such embodiments, OLT 710 may build and maintain a reachability table associating ONU-IDs, transmitter interface numbers (TXIF#), and receiver interface numbers (RXIF#). An example reachability table is described below in conjunction with FIG. 5.

After OLT 710 concludes serial number discovery associated with the first downstream wavelength, OLT 710 initiates serial number discovery associated with a second downstream wavelength. OLT 710 does so by transmitting a downstream configuration message 712 (e.g., an ONU serial number request message such as a "SN-RQ-All" message with alloc-ID=254), not illustrated, at a second wavelength (e.g., $\lambda_2$) to a second set of one or more ONUs 720 (e.g., ONUs beginning with "720b"). In particular embodiments, message 712 may be the same as the serial number request message used in the G.984.3 protocol. To avoid any collisions due to simultaneous responses from ONUs 720 in the upstream direction, in particular embodiments, OLT 710 transmits a configuration message with alloc-ID=255 or with no bandwidth allocation for upstream transmission (e.g., ZeroPointers) at the other downstream WDM wavelengths. The ONUs 720 receiving traffic in the second wavelength (e.g., ONUs beginning with "720b") respond to the request by reporting their serial numbers to OLT 710 in suitable configuration messages $714_1$-$714_n$ (e.g., "SN-ONU" messages), not illustrated. These configuration messages 714 may be received at particular receivers at OLT 710. In particular embodiments, messages 714 may be the same as the serial number response messages used in the G.984.3 protocol. OLT 710 may then assign an ONU-ID to each reporting ONU 720 in particular embodiments.

Using serial number discovery, OLT 710 associates each ONU in the second set of ONUs illustrated as beginning with "720b" with the second downstream wavelength $\lambda_2$ and with the upstream wavelength in which the ONU's configuration message 714b is transmitted. Thus, OLT 710 associates ONU 720ba1 with downstream $\lambda_2$ and upstream $\lambda_1$, ONU 720bb2 with downstream $\lambda_2$ and upstream $\lambda_2$, ONU 720bN3 with downstream $\lambda_2$ and upstream $\lambda_N$, and ONU 720bNn with downstream $\lambda_2$ and upstream $\lambda_N$.

Since each downstream wavelength may correspond to a particular transmitter interface and each upstream wavelength may correspond to a particular receiver interface in particular embodiments, OLT 710 may associate the second set of ONUs beginning with "720b" with a second transmitter interface transmitting at $\lambda_2$ and may also associate each of these ONUs with the particular receiver interface receiving traffic from the ONU. In such embodiments, OLT 710 may associate the ONU-IDs for these ONUs 720 with a corresponding TXIF# and RXIF#'s in the reachability table.

Serial number discovery may be performed sequentially for each additional wavelength transmitted at OLT 710. Using the sequential auto-discovery scheme described, OLT 710 may associate each ONU 720 with a particular downstream wavelength and upstream wavelength in the reachability table. In this way, ONUs 720 may be automatically installed and activated in the HPON. In addition, because no modification of the ITU-T G.984.3 message formats may be required in particular embodiments, the sequential auto-discovery scheme may provide an efficient solution.

It should be noted that, although particular embodiments are described in conjunction with an upgrade from the GPON system architecture and messaging protocol, alternative embodiments may be associated with upgrades from other PSPON systems having similar architectures and messaging protocols, such as BPON and GEPON systems, or HPON systems having similar architectures and messaging protocols. It should further be noted that the sequential auto-discovery scheme described above may be performed at any suitable time, such as, for example, at the first installation of one or more ONUs, in conjunction with network recovery, periodically (e.g., after a certain amount of time has passed, which may be provisionable) and/or after manual initiation by a network operator.

FIG. 5 is a diagram illustrating an example reachability table 800 associated with the auto-discovery of reachability scheme of FIG. 4. Reachability table 800 may, for example, be maintained and/or accessed by an OLT in an HPON to route downstream and upstream traffic appropriately. Column 810 includes transmitter interface numbers (TXIF#s) associated with transmitter interfaces at the OLT. In the illustrated embodiment, it is assumed that each transmitter interface in the OLT is associated with only one wavelength. In alternative embodiments, downstream wavelengths transmitted to sets of ONUs may be identified in any other suitable manner. In particular embodiments, entries in column 810 may be entered manually by an operator. In alternative embodiments, entries in column 810 may be automatically discovered.

Column 820 includes receiver interface numbers (RXIF#s) associated with the receivers at the OLT that received configuration messages from ONUs. For each OLT transmitter, column 820 identifies a set of one or more OLT receivers that received configuration messages from the ONUs receiving downstream traffic from the particular OLT transmitter. In the illustrated embodiment, each OLT transmitter may be associated with all OLT receivers. However, in alternative embodiments, each OLT transmitter may be associated with any other suitable number of OLT receivers, including a single OLT receiver or multiple (but not all) OLT receivers. In addition, OLT transmitters may be associated with different OLT receivers than that illustrated. It should be noted that, in particular embodiments, column 820 may be populated after configuration response messages are received and tagged with the RXIF#'s of the receiver(s) receiving them. In particular embodiments, OLT transmitters and receivers may be synchronized.

Column 830 includes ONU serial numbers associated with ONUs in the HPON. As described further below, for each transmitter interface, table 800 includes in the row 870 associated with the transmitter interface the set of ONU serial numbers corresponding to the ONUs to which the transmitter interface is to send traffic in a particular wavelength. The set of ONU serial numbers may include one or more serial numbers for each transmitter interface. In table 800, each ONU serial number is further associated with a RXIF# (receiving a configuration message from the ONU), described above, and an ONU-ID, OMCC Port-ID, and particular Port-ID services, described below. In particular embodiments, entries in column 830 may be discovered using the auto-discovery scheme of FIG. 4 (described above) or FIG. 6 (described below).

Column 840 includes ONU-ID numbers associated with ONUs in the HPON. As described above, the OLT may assign in any suitable manner particular ONU-ID numbers to those ONUs responding with their serial numbers. Thus, the OLT may associate, for example, a particular ONU-ID number with a particular ONU serial number during discovery. As with serial numbers, for each transmitter interface, table 800 includes in the row 870 associated with the transmitter interface the set of ONU-ID numbers corresponding to the ONUs to which the transmitter interface is to send traffic in a particular wavelength.

Column 850 includes OMCC Port-ID numbers associated with ONUs in the HPON. As discussed above, OMCC refers to an ONU management and control channel. In the illustrated embodiment, one such channel is set up for each ONU, and control and management messaging between the OLT and the ONU is communicated through the channel. This channel is identified using this OMCC Port-ID. Column 860 includes Port-ID services associated with particular Port-IDs. In particular embodiments, one or more services may correspond to a particular Port-ID. As examples only, these services may include voice over internet protocol (VOIP), internet protocol television (IPTV), and/or high speed internet access.

Thus, each row 870 corresponds to a particular OLT transmitter interface number and associates one or more OLT receiver interface numbers, one or more ONU serial numbers, one or more ONU-ID numbers, one or more OMCC Port-ID numbers, and one or more Port-ID services to the particular transmitter interface number. By associating sets of one or more ONUs to particular wavelengths transmitted at the OLT and to particular OLT receivers, table 700 may be used to route downstream and/or upstream traffic appropriately.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 6:
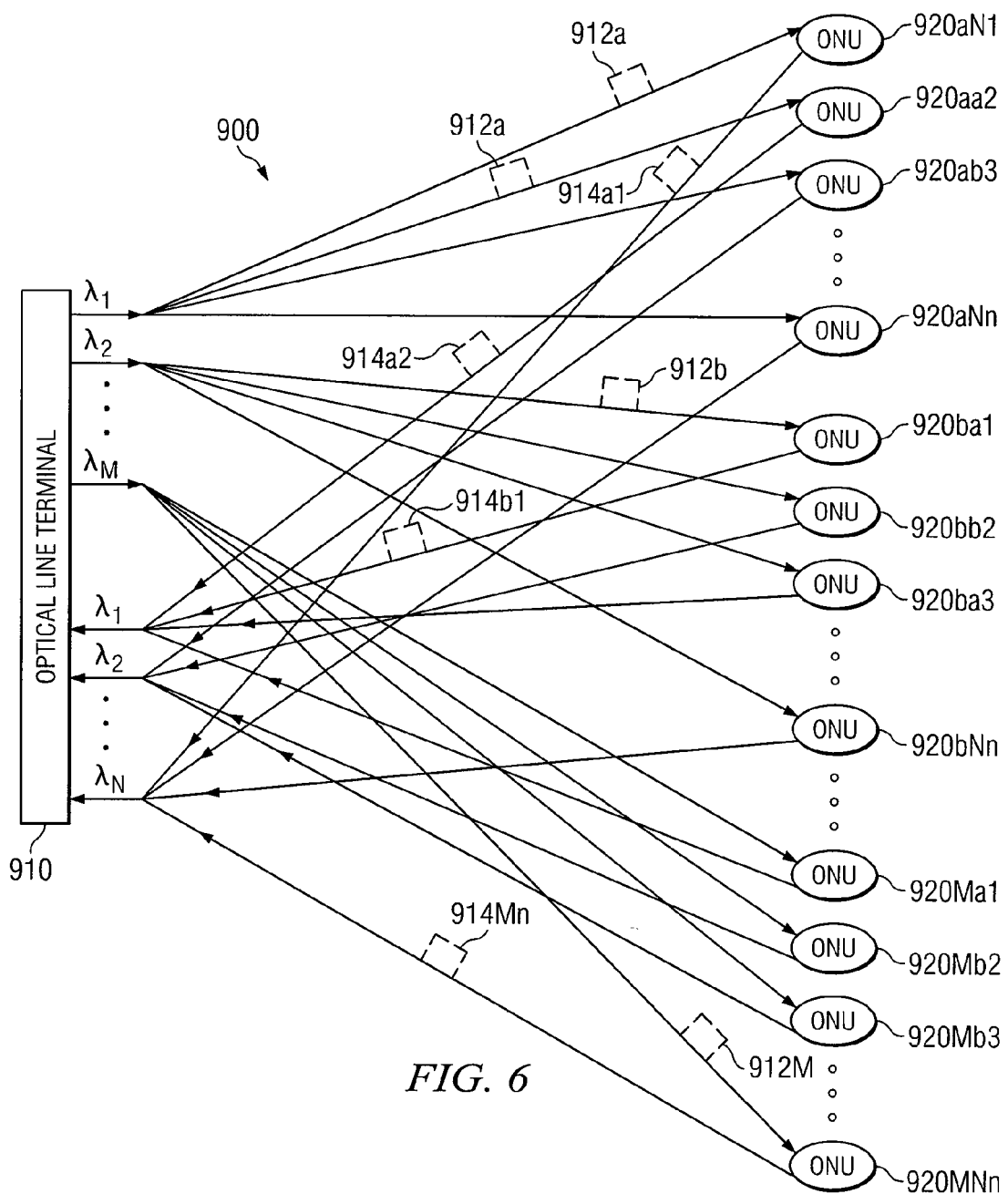
FIG. 6 is a diagram illustrating another auto-discovery of reachability scheme in an example HPON logical topology according to a particular embodiment of the invention.

FIG. 6 is a diagram illustrating another auto-discovery of reachability scheme in an example HPON logical topology 900 according to a particular embodiment of the invention. Topology 900 comprises OLT 910 and ONUs 920. In particular embodiments, OLT 910 and ONUs 920 may be the same as OLT 612 and ONUs 650, respectively, and thus will not be described again in detail. It should be noted that, for each $ONU_{ijk}$, "i" corresponds to the downstream wavelength being received by the ONU, "j" corresponds to the upstream wavelength being transmitted by the ONU, and "k" corresponds to the ONU number.

As can be observed, in the downstream direction, wavelengths transmitted by OLT 910 ($\lambda_1$-$\lambda_M$) are shared by particular groups of ONUs 920. For example, each $ONU_{ijk}$ where "i" equals "a" shares downstream $\lambda_1$, each $ONU_{ijk}$ where "i" equals "b" shares downstream $\lambda_2$, and each $ONU_{ijk}$ where "i" equals "M" shares downstream $\lambda_M$. In the upstream direction, sets of ONUs 720 transmit upstream traffic in particular wavelengths ($\lambda_1$-$\lambda_N$). For example, each $ONU_{ijk}$ where "j" equals "a" transmits upstream traffic in $\lambda_1$, each $ONU_{ijk}$ where "j" equals "b" transmits upstream traffic in $\lambda_2$, and each $ONU_{ijk}$ where "j" equals "N" transmits upstream traffic in $\lambda_N$.

It should be noted that, although some of the downstream and upstream wavelengths are illustrated with the same designation (e.g., $\lambda_1$ in the downstream and upstream directions), these may be the same or different wavelengths. Also, the number of downstream wavelengths "M" may be the same or different than the number of upstream wavelengths "N." Further, the sets of ONUs 920 sharing downstream and upstream wavelengths in FIG. 6 are illustrative. In alternative embodiments, any combination of zero, one, or more ONUs 920 from each set of ONUs 920 receiving downstream traffic in the same wavelength (e.g., zero, one or more of the ONUs in sets 920a, 920b, and 920M) may transmit upstream traffic in any suitable wavelength (e.g., in $\lambda_1$, $\lambda_2$, or $\lambda_N$). For example, in particular embodiments, all of the ONUs beginning with "920a" may transmit upstream traffic in the same wavelength (e.g., $\lambda_N$). Alternatively, only some of the ONUs beginning with "920a" may transmit upstream traffic in the same wavelength (as illustrated). Alternatively, each ONU beginning with "920a" may transmit upstream traffic in a different wavelength.

The scheme of FIG. 6 is an example of a simultaneous auto-discovery scheme. As in a sequential auto-discovery scheme, the OLT 910 in a simultaneous auto-discovery scheme associates particular downstream wavelengths with the one or more ONUs 920 that are to receive traffic in each of the wavelengths. Also, the OLT 910 associates each ONU 920 with the OLT receiver that is to receive upstream traffic from the ONU 920. Unlike in a sequential auto-discovery scheme, however, each group of wavelength-sharing ONUs 920 is discovered in parallel by initiating discovery for all downstream wavelengths concurrently.

An advantage of concurrent discovery is decreased time to complete ONU initialization. However, concurrent discovery may require minor modifications to the ITU-T G.984.3 protocol in particular embodiments. These modifications may include tagging particular upstream and downstream physical layer overhead messages with transmitter interface numbers. Such tagging may allow the OLT receiver to suitably identify the ONUs 920 associated with each transmitter interface transmitting at a particular downstream wavelength. By requiring minor modifications to the ITU-T G.984.3 protocol, such tagging may require modifications to OLT and/or ONU firmware and software in particular embodiments.

In particular embodiments, the physical layer overhead messages may be tagged with the transmitter interface number during discovery. For example, downstream configuration messages 912 (e.g., discovery messages such as serial number requests concurrently transmitted by the OLT's transmitter interfaces) may be tagged with a transmitter interface number (TXIF#) by OLT 910. Thus, configuration messages 912a-912M may be tagged with TXIF#1-M, respectively.

ONUs 920 may respond by reporting their serial numbers to OLT 910 in an upstream configuration message 914 (e.g., in the "SN-ONU" message) and include the received TXIF# in the upstream configuration message 914. In particular embodiments, a new PLOAM messaging structure could be defined for the OLT serial number request and for the ONU serial number response to explicitly add the TXIF#. In alternative embodiments, existing fields in the OLT serial number request and ONU serial number response could be used to transmit the TXIF#. For example, in particular embodiments, the "IDENT" attribute field in the downstream configuration message and the "IND" attribute field in the upstream configuration message may be used to carry the TXIF#. In alternative embodiments, any suitable field may be used to carry the TXIF#. To maintain backwards compatibility, these attributes may be reconfigurable to follow the ITU-T G.984.3 protocol in particular embodiments.

Particular receivers at OLT 910 may receive configuration messages 914 from particular downstream ONUs 920. OLT 910 may tag, in any suitable manner, each reporting ONU's configuration message with the OLT receiver receiving the ONU's response. OLT 910 may also assign an ONU-ID to each reporting ONU 920 in particular embodiments.

OLT 910 may maintain a reachability table that associates each ONU in the first set of ONUs illustrated as beginning with "920a" with the first downstream wavelength $\lambda_1$ (or with the OLT transmitter transmitting at $\lambda_1$) and with the upstream wavelength in which the ONU's configuration message 914a is transmitted (or with the OLT receiver that receives the ONU's configuration message 914a). Thus, OLT 910 associates ONU 920aN1 with downstream $\lambda_1$ and upstream $\lambda_N$, ONU 920aa2 with downstream $\lambda_1$ and upstream $\lambda_1$, ONU 920ab3 with downstream $\lambda_1$ and upstream $\lambda_2$, and ONU 920aNn with downstream $\lambda_1$ and upstream $\lambda_N$.

The reachability table may also associate each ONU in the second set of ONUs illustrated as beginning with "920b" with the second downstream wavelength $\lambda_2$ and with the upstream wavelength in which the ONU's configuration message 914b is transmitted. Thus, OLT 910 associates 920ba1 with downstream $\lambda_2$ and upstream $\lambda_1$, 920bb2 with downstream $\lambda_2$ and upstream $\lambda_2$, 920ba3 with downstream $\lambda_2$ and upstream $\lambda_1$, and 920bNn with downstream $\lambda_2$ and upstream $\lambda_N$.

The reachability table may further associate each ONU in the Mth set of ONUs illustrated as beginning with "920M" with the Mth downstream wavelength $\lambda_M$ and with the upstream wavelength in which the ONU's configuration message 914M is transmitted. Thus, OLT 910 associates 920Ma1 with downstream $\lambda_M$ and upstream $\lambda_1$, 920Mb2 with downstream $\lambda_M$ and upstream $\lambda_2$, 920Mb3 with downstream $\lambda_M$ and upstream $\lambda_2$, and 920MNn with downstream $\lambda_M$ and upstream $\lambda_N$.

Since each downstream wavelength may correspond to a particular transmitter interface and each upstream wavelength may correspond to a particular receiver interface in particular embodiments, OLT 910 may associate ONUs 920 in the reachability table with particular transmitter interfaces and receiver interfaces (e.g., through TXIF#'s and RXIF#'s). It should be noted that a similar example reachability table as table 800, described above, may be maintained by OLT 910. Thus, this reachability table will not be described again in detail.

Tagging during discovery, as described above, may associate particular sets of one or more ONUs with particular TXIF#'s and RXIF#'s. However, such tagging may require modifications to both the OLT and ONU software (and/or firmware) since the G.984.3 protocol does not prescribe such tagging. For example, the OLT may be required to tag a downstream configuration message with a TXIF#, and ONUs may be required to tag a configuration response message with the received TXIF#. As described below, if the OLT transmits the TXIF# in an unused configuration message field that the ONUs acknowledge by copying the first nine bytes of the incoming message under the G.984.3 protocol, no modifications to ONU software may be necessary (although modifications to OLT software may still be necessary). Such embodiments may provide for a more efficient simultaneous auto-discovery scheme in particular circumstances.

In particular embodiments, the transmitter interfaces at OLT 910 may perform ONU serial number discovery and ranging concurrently for all ONUs 920 without modifications to the ITU-T G.984.3 configuration messages. During discovery, OLT 910 may receive ONU serial numbers and assign ONU-IDs to these serial numbers (and not associate downstream wavelengths with ONUs 920 at this point). In particular embodiments, OLT 910 may also associate each ONU 920 with the particular OLT receiver that receives the ONU's serial number. After discovery is completed according to the G.984.3 protocol procedures, OLT 910 may associate downstream wavelengths with ONUs 920. OLT 910 may do so by including transmitter interface numbers (TXIF#'s) in particular downstream configuration messages 912 sent after discovery. In particular embodiments, each ONU 920 may include its assigned ONU-ID and a copy of the first nine bytes of the incoming configuration message (including the TXIF#) in a configuration response message (e.g., an acknowledge message). After receiving a configuration response message 914 from each ONU 920, OLT 910 may associate particular downstream wavelengths with particular ONUs 920. In particular embodiments, OLT 910 may also associate each ONU 920 with the particular OLT receiver that receives the ONU's configuration response message 914 (e.g., OLT 910 may do so when this association has not been made earlier).

As an example only, in particular embodiments, OLT 910 may tag with TXIF#'s the "Configure Port-ID" PLOAM messages used to configure OMCC after discovery. The TXIF#'s may occupy, for example, unused bits in the "Configure Port-ID" messages (as defined by the ITU-T G.984.3 protocol). After receiving a corresponding "Configure Port-ID" message, each ONU 920 may include its assigned ONU-ID and a copy of the first nine bytes of the incoming "Configure Port-ID" message in an acknowledge message. After receiving an acknowledge message from an ONU 920, OLT 910 may associate a particular downstream wavelength (corresponding to the TXIF# received and reflected by the ONU 920) with the ONU 920. OLT 910 may also associate the ONU 920 with the corresponding OLT receiver (e.g., if it has not done so already).

After receiving upstream configuration messages 914 (e.g., acknowledge messages) from all of the ONUs 920, OLT 910 may maintain a reachability table associating ONUs 920 (e.g., through ONU-IDs) with the downstream wavelength(s) (e.g., through TXIF#'s) received by the ONUs 920 and with the OLT receivers (e.g., through RXIF#'s) receiving traffic from the ONUs 920. Thus, for example, ONUs 920a may be associated in the reachability table with downstream wavelength $\lambda_1$ and corresponding OLT receivers, ONUs 920b may be associated in the reachability table with downstream wavelength $\lambda_2$ and corresponding OLT receivers, and ONUs 920M may be associated in the reachability table with downstream wavelength $\lambda_M$ and corresponding OLT receivers.

It should be noted that a similar example reachability table as table 800, described above, may be maintained by OLT 910. Thus, this reachability table will not be described again in detail. It should also be noted that, since, in particular embodiments, unused bits in the "Configure Port-ID" and ONU acknowledge messages are used in the upgrade, backwards compatibility to GPON is ensured in those embodiments. In addition, no change in the physical layer overhead structure (e.g., "IDENT" and "IND") and no firmware or software upgrade at ONUs 920 is required in particular embodiments.

It should further be noted that any suitable field in any suitable configuration message may be used to carry a wavelength identifier (e.g., a TXIF#). In addition, any suitable identifier of a downstream WDM wavelength (e.g., a TXIF#) may be used. Also, any suitable identifier of an ONU (e.g., an ONU serial number or ONU-ID) may be used. It should further be noted that, although particular embodiments are described in conjunction with an upgrade from the GPON system architecture and messaging protocol, alternative embodiments may be associated with upgrades from other PSPON systems having similar architectures and messaging protocols, such as, for example, BPON and GEPON systems.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 7:
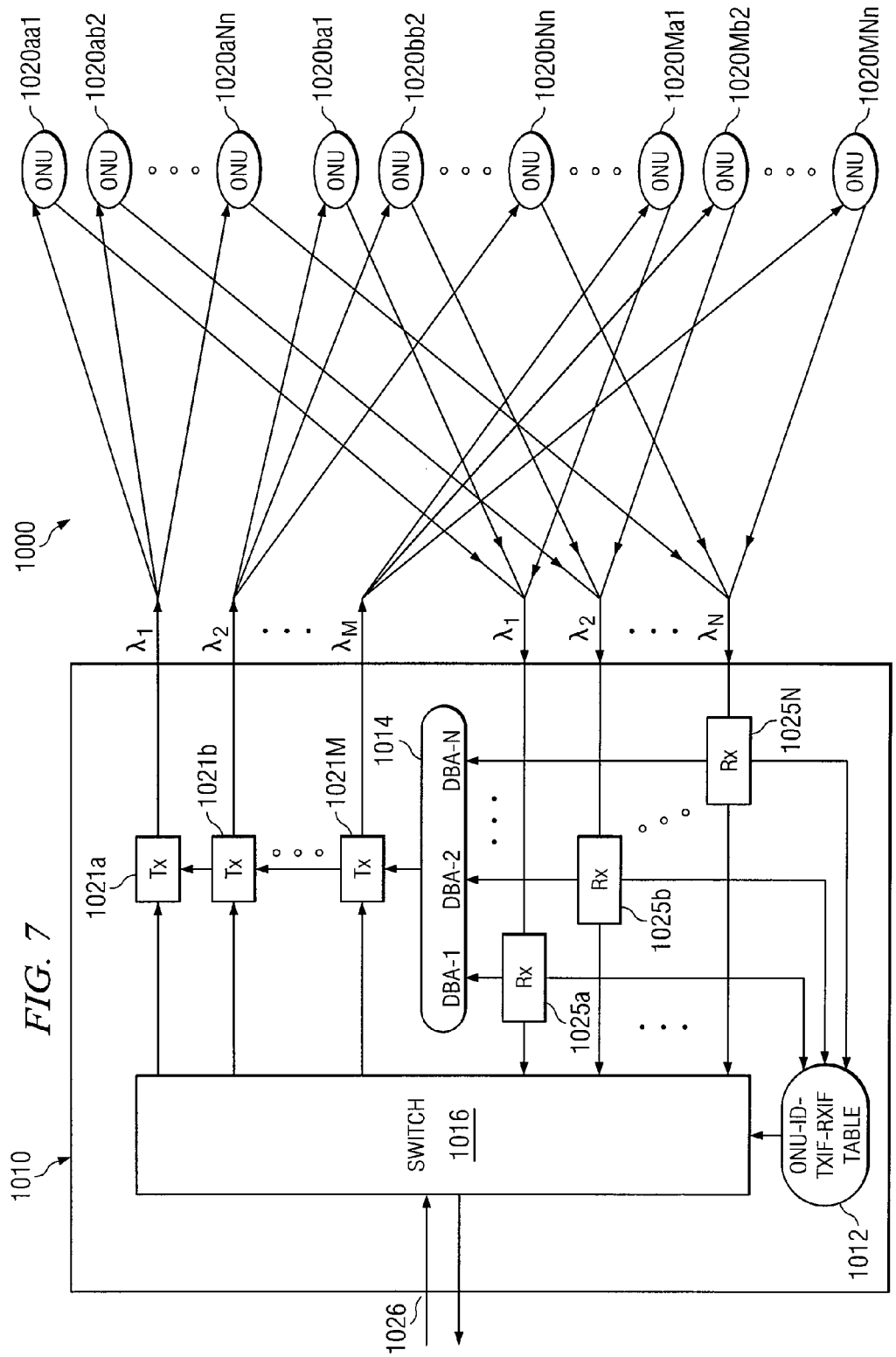
FIG. 7 is a diagram illustrating an example OLT in an example HPON logical topology according to a particular embodiment of the invention.

FIG. 7 is a diagram illustrating an example OLT 1010 in an example HPON logical topology 1000 according to a particular embodiment of the invention. Topology 1000 comprises OLT 1010 and ONUs 1020. In particular embodiments, OLT 1010 and ONUs 1020 may be the same as OLT 612 and ONUs 650, respectively, and thus will not be described again in detail. As described further below, HPON logical topology 1000 may allow for an efficient upgrade to an HPON transmitting at multiple upstream wavelengths. Topology 1000 may do so by efficiently associating particular ONUs 1020 with particular OLT transmitters 1021 and OLT receivers 1025 in a reachability table 1012 in OLT 1010. In particular embodiments, topology 1000 may use the reachability table 1012 (and switch 1016) to forward downstream traffic to an appropriate ONU 1020 (through a corresponding transmitter 1021) and to build suitable upstream bandwidth allocation maps, as described further below.

In topology 1000, OLT 1010 comprises a reachability table 1012, a dynamic bandwidth allocation (DBA) engine 1014, a switch 1016, transmitters 1021, receivers 1025, and a system port 1026. In particular embodiments, transmitters 1021 and receivers 1025 may be the same as transmitters 514 and receivers 619, respectively, described above in conjunction with FIG. 3. Thus, transmitters 1021 and receivers 1025 will not be described again in detail. Transmitter interfaces of transmitters 1021 may be configured to interface between transmitters 1021 and ONUs 1020. These transmitter interfaces may also be synchronized to coordinate communication of discovery and/or control messages to ONUs 1020. Receiver interfaces of receivers 1025 may be configured to interface between ONUs 1020 and receiver 1025. Transmitter interfaces and receiver interfaces at OLT 1010 may be synchronized in particular embodiments. System port 1026 is configured to forward network traffic downstream to switch 1016 and to receive upstream traffic from switch 1016 to communicate over the network.

Reachability table 1012 may comprise any suitable reachability table, such as, for example, a table similar to table 800 described above in conjunction with FIG. 5. Reachability table 1012 is operable to associate particular OLT transmitter interfaces (i.e., downstream WDM wavelengths) and OLT receiver interfaces (i.e., upstream WDM wavelengths) with particular ONUs (using, e.g., ONU-IDs), as may be required in an upgrade to an HPON transmitting at multiple upstream wavelengths. Reachability table 1012 may be built and maintained in any suitable manner, such as, for example, at OLT 1010 as described above in conjunction with FIGS. 4 and 6.

DBA engine 1014 may comprise any suitable component operable to generate one or more bandwidth allocation maps used to allocate time slots to ONUs 1020 for upstream transmission. DBA engine 1014 may also be operable to forward these one or more maps to corresponding transmitters 1021. In particular embodiments, DBA engine 1014 may comprise a DBA engine for each OLT receiver. In such embodiments, each of these DBA engines may receive the bandwidth requests/reports from ONUs 1020 downstream of the corresponding OLT receiver. In particular embodiments, each of these DBA engines may be independent from the other DBA engines and may use a particular algorithm for allocation of bandwidth (which may be different than the algorithms used by the other DBA engines). In particular embodiments, the bandwidth allocation maps from the DBA engines may be combined, and the combined bandwidth allocation map may be forwarded to each OLT transmitter 1021 for transmission to ONUs 1020. In alternative embodiments, the bandwidth allocation maps from the DBA engines may be organized (using, for example the associations in table 1012) such that each OLT transmitter 1021 transmits only the bandwidth allocation map that corresponds to the ONUs 1020 downstream of that transmitter. In yet alternative embodiments, DBA engine 1014 may comprise a single DBA engine that receives the bandwidth requests/reports from all ONUs 1020, uses a particular algorithm for allocation of bandwidth, and forwards the resulting bandwidth allocation map to all OLT transmitters 1021 or a particular bandwidth allocation map (corresponding to an OLT transmitter's downstream ONUs 1020 and generated using table 1012) to each OLT transmitter 1021. The physical layer overhead structure includes the configuration message and the bandwidth allocation map.

It should be noted that, in particular embodiments, reachability table 1012 may also be used for fault localization. For example, in particular embodiments, particular ONUs 1020 (e.g., all of the ONUs beginning with "1020a") may send downstream signal failure indications to OLT 1010. OLT 1010 may use reachability table 1012 to determine, for example, that the signal failure indications are all being sent from the ONUs beginning with "1020a" that are connected to a particular OLT transmitter 1021a. Using reachability table 1012, OLT 1010 may thus determine that the potential fault location is the connection between the RN multiplexer and the ONUs beginning with "1020a."

Switch 1016 may comprise any suitable component operable to route incoming network traffic in the downstream direction to an appropriate OLT transmitter 1021 (and ultimately to an appropriate ONU 1020). Switch 1016 may route downstream traffic to an appropriate OLT transmitter 1021 based on the traffic identifiers (e.g., virtual local area network (VLAN) or Ethernet Media Access Control (MAC) address) and based on the ONU-ID—TXIF associations in reachability table 1012. For example, after receiving downstream traffic from system port 1026, switch 1016 may use the associated traffic identifiers to determine the ONU 1020 to which the traffic is to be communicated. Based on reachability table 1012, switch 1016 may forward the traffic to the OLT transmitter 1021 corresponding to the ONU 1020. In the upstream direction, switch 1016 may combine the traffic from each OLT receiver 1025 in particular embodiments and forward the traffic to system port 1026 for communication over the network. Optionally, upstream bursts may be switched to corresponding system ports (not illustrated) based on ONU-ID, if multiple ports to the Ethernet switch are used.

In operation of HPON 1000, reachability table 1012 may be built and maintained during an initialization phase as described above in conjunction with any of FIGS. 4, 5, and 6. System port 1026 receives incoming network traffic in the downstream direction and forwards the traffic to switch 1016. Switch 1016 routes the incoming network traffic in the downstream direction to an appropriate transmitter 1021 based on the associated traffic identifiers and on reachability table 1012. For example, after receiving downstream traffic from system port 1026, switch 1016 uses the associated traffic identifiers to determine the ONU 1020 to which the traffic is to be communicated. Based on reachability table 1012, switch 1016 forwards the traffic to the transmitter 1021 corresponding to the ONU 1020. Traffic is then communicated to the appropriate ONU 1020.

In the upstream direction, ONUs 1020 transmit traffic in corresponding wavelengths $\lambda_1$-$\lambda_N$ according to the bandwidth allocation map(s) generated by DBA engine 914 (which may comprise one or more DBA engines). These map(s) may be generated using table 1012 in particular embodiments and without using table 1012 in alternative embodiments. Upstream bursts received at receivers 1025 are communicated to switch 1016. In particular embodiments, switch 1016 forwards these upstream bursts to the network through system port 1026. In alternative embodiments, switch 1016 forwards these upstream bursts to the network through corresponding system ports (not illustrated).

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for managing communication in a hybrid passive optical network (HPON), comprising:
    transmitting, at a first wavelength, a first configuration message on the HPON;
    receiving at one or more of a plurality of receivers at an optical line terminal (OLT) one or more configuration response messages from one or more optical network units (ONUs) in a first set of ONUs;
    based on the configuration response messages from the first set of ONUs, associating, in a database, each ONU in the first set of ONUs with the first wavelength and with the receiver receiving the configuration response message from the ONU;

after transmitting the first configuration message, transmitting, at a second wavelength, a second configuration message on the HPON;
receiving at one or more of the plurality of receivers at the OLT one or more configuration response messages from one or more ONUs in a second set of ONUs, wherein the ONUs in the second set of ONUs do not belong to the first set of ONUs; and
based on the configuration response messages from the second set of ONUs, associating, in the database, each ONU in the second set of ONUs with the second wavelength and with the receiver receiving the configuration response message from the ONU.

2. The method of claim 1, further comprising:
receiving at each receiver bandwidth requests from the ONUs downstream of the receiver;
forwarding the bandwidth requests received at a receiver to a dynamic bandwidth allocation (DBA) engine; and
applying an algorithm for allocation of bandwidth to the bandwidth requests at the DBA engine.

3. The method of claim 2, wherein:
the bandwidth requests received at each receiver are forwarded to a DBA engine associated with that one receiver; and
the algorithm for allocation of bandwidth at one DBA engine is different than the algorithm for allocation of bandwidth at another DBA engine.

4. The method of claim 2, wherein the bandwidth requests received at the receivers are forwarded to a single DBA engine.

5. The method of claim 2, further comprising generating one or more bandwidth allocation maps used to allocate time slots to the ONUs for upstream transmission.

6. The method of claim 5, further comprising transmitting the same bandwidth allocation map to the first set of ONUs and to the second set of ONUs.

7. The method of claim 5, wherein a plurality of bandwidth allocation maps are generated using the database, further comprising transmitting a first bandwidth allocation map to the first set of ONUs and a second bandwidth allocation map to the second set of ONUs.

8. An optical line terminal (OLT) for managing communication in a hybrid passive optical network (HPON), comprising:
a first transmitter interface configured to transmit a first configuration message on the HPON;
a plurality of receivers at the OLT, one or more of which are configured to:
receive one or more configuration response messages from one or more optical network units (ONUs) in a first set of ONUs; and
based on the configuration response messages received from the first set of ONUs, associate, in a database, each ONU in the first set of ONUs with the first transmitter interface and with the receiver receiving the configuration response message from the ONU;
a second transmitter interface configured to transmit a second configuration message on the HPON after the first transmitter interface transmits the first configuration message;
wherein one or more of the plurality of receivers are configured to:
receive one or more configuration response messages from one or more ONUs in a second set of ONUs, wherein the ONUs in the second set of ONUs do not belong to the first set of ONUs; and
based on the configuration response messages from the second set of ONUs, associate, in the database, each ONU in the second set of ONUs with the second transmitter interface and with the receiver receiving the configuration response message from the ONU.

9. The OLT of claim 8, wherein each of the plurality of receivers at the OLT is further configured to:
receive bandwidth requests from the ONUs downstream of the receiver; and
forward the received bandwidth requests to a dynamic bandwidth allocation (DBA) engine;
the OLT further comprising one or more DBA engines configured to apply one or more algorithms for allocation of bandwidth to any received bandwidth requests.

10. The OLT of claim 9, wherein:
the bandwidth requests received at each receiver are forwarded to a DBA engine associated with that one receiver; and
the algorithm for allocation of bandwidth at one DBA engine is different than the algorithm for allocation of bandwidth at another DBA engine.

11. The OLT of claim 9, wherein the bandwidth requests received at the receivers are forwarded to a single DBA engine.

12. The OLT of claim 9, wherein the one or more DBA engines are further configured to generate one or more bandwidth allocation maps used to allocate time slots to the ONUs for upstream transmission.

13. The OLT of claim 12, wherein the transmitter interfaces are further configured to transmit the same bandwidth allocation map to the first set of ONUs and to the second set of ONUs.

14. The OLT of claim 12, wherein:
the one or more DBA engines are further configured to generate a plurality of bandwidth allocation maps using the database;
the first transmitter interface is further configured to transmit a first bandwidth allocation map to the first set of ONUs; and
the second transmitter interface is further configured to transmit a second bandwidth allocation map to the second set of ONUs.

15. A method for managing communication in a hybrid passive optical network (HPON), comprising:
transmitting, at a first wavelength, a first configuration message on the HPON, wherein the first configuration message comprises a first transmitter interface number;
transmitting, at a second wavelength and at approximately the same time as the first configuration message, a second configuration message on the HPON, wherein the second configuration message comprises a second transmitter interface number;
receiving at one or more of a plurality of receivers at an optical line terminal (OLT) one or more configuration response messages from one or more optical network units (ONUs) in a first set of ONUs, each message comprising the first transmitter interface number;
receiving at one or more of a plurality of receivers at an optical line terminal (OLT) one or more configuration response messages from one or more optical network units (ONUs) in a second set of ONUs, each message comprising the second transmitter interface number; and
based on the configuration response messages from the first set and second set of ONUs:

associating, in a database, each ONU in the first set of
ONUs with the first wavelength and with the receiver
receiving the configuration response message from
the ONU; and
associating, in the database, each ONU in the second set
of ONUs with the second wavelength and with the
receiver receiving the configuration response message from the ONU.

16. The method of claim 15, further comprising:
receiving at each receiver bandwidth requests from the
ONUs downstream of the receiver;
forwarding the bandwidth requests received at a receiver to
a dynamic bandwidth allocation (DBA) engine; and
applying an algorithm for allocation of bandwidth to the
bandwidth requests at the DBA engine.

17. The method of claim 16, wherein:
the bandwidth requests received at each receiver are forwarded to a DBA engine associated with that one
receiver; and
the algorithm for allocation of bandwidth at one DBA
engine is different than the algorithm for allocation of
bandwidth at another DBA engine.

18. The method of claim 16, wherein the bandwidth
requests received at the receivers are forwarded to a single
DBA engine.

19. The method of claim 16, further comprising generating
one or more bandwidth allocation maps used to allocate time
slots to the ONUs for upstream transmission.

20. The method of claim 19, further comprising transmitting the same bandwidth allocation map to the first set of
ONUs and to the second set of ONUs.

21. The method of claim 19, wherein a plurality of bandwidth allocation maps are generated using the database, further comprising transmitting a first bandwidth allocation map
to the first set of ONUs and a second bandwidth allocation
map to the second set of ONUs.

22. An optical line terminal (OLT) for managing communication in a hybrid passive optical network (HPON), comprising:
a first transmitter interface configured to transmit a first
configuration message on the HPON, wherein the first
configuration message comprises a first transmitter
interface number;
a second transmitter interface configured to transmit a second configuration message on the HPON at approximately the same time as the first message, wherein the
second configuration message comprises a second transmitter interface number, and
a plurality of receivers at the OLT, one or more of which are
configured to:
receive one or more configuration response messages
from one or more optical network units (ONUs) in a
first set of ONUs, each message comprising the first
transmitter interface number;
receive one or more configuration response messages
from one or more optical network units (ONUs) in a
second set of ONUs, each message comprising the
second transmitter interface number; and
based on the configuration response messages from the
first set and second set of ONUs:
associate, in a database, each ONU in the first set of
ONUs with the first wavelength and with the
receiver receiving the configuration response message from the ONU; and
associate, in the database, each ONU in the second set
of ONUs with the second wavelength and with the
receiver receiving the configuration response message from the ONU.

23. The OLT of claim 22, wherein each of the plurality of
receivers at the OLT is further configured to:
receive bandwidth requests from the ONUs downstream of
the receiver; and
forward the received bandwidth requests to a dynamic
bandwidth allocation (DBA) engine;
the OLT further comprising one or more DBA engines
configured to apply one or more algorithms for allocation of bandwidth to any received bandwidth requests.

24. The OLT of claim 23, wherein:
the bandwidth requests received at each receiver are forwarded to a DBA engine associated with that one
receiver; and
the algorithm for allocation of bandwidth at one DBA
engine is different than the algorithm for allocation of
bandwidth at another DBA engine.

25. The OLT of claim 23, wherein the bandwidth requests
received at the receivers are forwarded to a single DBA
engine.

26. The OLT of claim 23, wherein the one or more DBA
engines are further configured to generate one or more bandwidth allocation maps used to allocate time slots to the ONUs
for upstream transmission.

27. The OLT of claim 26, wherein the transmitter interfaces
are further configured to transmit the same bandwidth allocation map to the first set of ONUs and to the second set of
ONUs.

28. The OLT of claim 26, wherein:
the one or more DBA engines are further configured to
generate a plurality of bandwidth allocation maps using
the database;
the first transmitter interface is further configured to transmit a first bandwidth allocation map to the first set of
ONUs; and
the second transmitter interface is further configured to
transmit a second bandwidth allocation map to the second set of ONUs.

* * * * *